United States Patent [19]
Fukuyama et al.

[11] Patent Number: 6,052,633
[45] Date of Patent: Apr. 18, 2000

[54] POWER STEERING APPARATUS FOR ELECTRIC VEHICLE

[75] Inventors: Yuichi Fukuyama, Yokohama; Satoshi Miura, Hadano, both of Japan

[73] Assignee: Nissan Motor Co., Ltd., Yokohama, Japan

[21] Appl. No.: 08/799,372

[22] Filed: Feb. 14, 1997

[30] Foreign Application Priority Data

Feb. 21, 1996 [JP] Japan .................................. 8-34070

[51] Int. Cl.⁷ .................................................. B62D 5/00
[52] U.S. Cl. ............................ 701/41; 701/50; 180/400; 180/412; 180/414; 180/443
[58] Field of Search ........................ 701/41–50; 180/443, 180/446, 412–6, 423, 428, 417; 307/9.1, 10.2

[56] References Cited

U.S. PATENT DOCUMENTS

| | | | |
|---|---|---|---|
| 4,759,420 | 7/1988 | Schipper et al. | 180/428 |
| 4,994,973 | 2/1991 | Makino et al. | 701/50 |
| 5,086,859 | 2/1992 | Takahashi et al. | 180/79.1 |
| 5,236,335 | 8/1993 | Takeuchi et al. | 180/446 |
| 5,602,735 | 2/1997 | Wada | 180/446 |

FOREIGN PATENT DOCUMENTS

| | | |
|---|---|---|
| 5-270424 | 10/1993 | Japan . |
| 5-278629 | 10/1993 | Japan . |

*Primary Examiner*—William A. Cuchlinski, Jr.
*Assistant Examiner*—Yonel Beaulieu
*Attorney, Agent, or Firm*—Foley & Lardner

[57] ABSTRACT

A power steering apparatus for an electric vehicle has a steering mechanism for steering a pair of steered wheels upon receiving assist power from a steering assist-power according to a steer force required for steering the steered wheels. A fluid pressure pump driven by an electric motor supplies pressurized fluid to the steering assist-power mechanism. An electric motor controller stops the electric motor when the electric-source voltage detected by an electric source voltage detector is greater than or equal to a voltage set value and when the steer angle detected by a steer angle detector is smaller than a steer angle set value, and prohibits stopping the electric motor when the electric-source voltage is smaller than the voltage set value. Therefore, it becomes possible to ensure the steering responsiveness under an electric voltage lowered condition while avoiding the disturbance to the electric source.

37 Claims, 16 Drawing Sheets

POWER STEERING APPARATUS FOR ELECTRIC VEHICLE

BACKGROUND OF THE INVENTION

The present invention relates to improvements in a power steering apparatus for an electric vehicle, and more particularly to a hydraulic pressure type power steering apparatus where a steering assisting-power is generated by the fluid pressure of the fluid pump driven by an electric motor.

A variety of power steering apparatuses for electric vehicles have been proposed. A Japanese Patent Provisional Publication No. 5-270424 discloses a typical power steering apparatus for an electric vehicle in which a hydraulic pump driven by an electric motor generates assist-power for steering. A steering mechanism, which steers a pair of steered wheels in the steered direction according to a rotational degree of a steering wheel, is assisted by a piston mechanism moved by the hydraulic pressure supplied from the electric hydraulic pump. Simultaneously, a first setting means sets a first assist power according to a vehicle speed and a steered condition during a steering period, and a second setting means sets the electric hydraulic pump to a stop mode in an extremely low speed range and sets the electric hydraulic pump into a minimum operation mode in a relatively high speed range as compared with the extremely low speed range during a non-steering period. This conventional apparatus improves the energy consumption of the hydraulic pump in the non-steered condition in the extremely low range, and improves the starting-up ability in a range higher than the extremely low speed range by setting the hydraulic pump in a minimum operation mode.

However, this conventional apparatus yet has a problem that the steer responsiveness is degraded by the deviation of the electric source voltage.

SUMMARY OF THE INVENTION

It is an object of the present invention to provide an improved power steering apparatus which ensures the steering responsiveness under an electric source lowered condition while avoiding the disturbance to the electric source.

A power steering apparatus according to the present invention is for an electric vehicle and comprises a steering mechanism which steers a pair of steered wheels according to an steering degree of a steering wheel. A steering assist-power generating mechanism generates an assist-power and supplies it to the steering mechanism according to a steer force required for steering the steered wheels. A fluid pressure pump is driven by an electric motor and supplies pressurized fluid for generating assist power to the steering assist-power mechanism. An electric motor controller controls the electric motor so as to stop the electric motor when the electric-source voltage detected by an electric source voltage detecting means is greater than or equal to a voltage set value and when the steer angle detected by a steer angle detecting means is smaller than a steer angle set value and to prohibit the stop of the electric motor when the electric-source voltage is smaller than the voltage set value.

DETAILED DESCRIPTION OF THE INVENTION

Referring to FIGS. 1 to 4, there is shown a first embodiment of a power steering apparatus according to the present invention.

Figure 1:
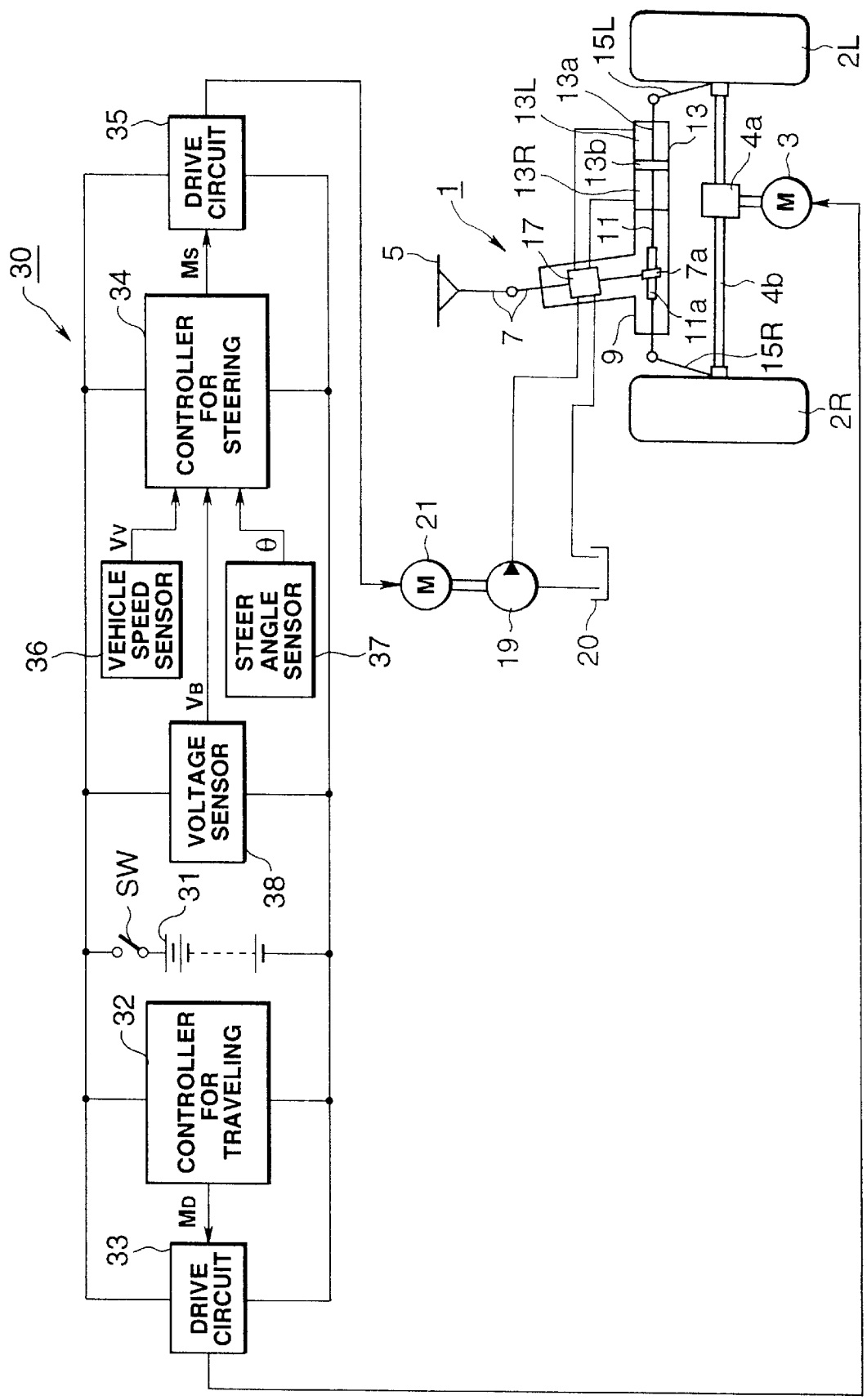
FIG. 1 is a schematic view of a first embodiment of a power steering apparatus according to the present invention.

The power steering apparatus of an electro-hydraulic type for an electric vehicle and is arranged as shown in FIG. 1. A steering mechanism 1 for steering a pair of front wheels 2L and 2R is connected to the front wheels 2L and 2R. An electric motor 3 such as an ac motor, is used for driving the front wheels 2L and 2R and is connected to the front wheels 2L and 2R through a reduction gear 4a and a drive shaft 4b. The steering mechanism 1 comprises a steering wheel 5 which is disposed in front of a driver seat in a passenger compartment of the electric vehicle. The steering wheel 5 is connected to an upper end of a steering shaft 7 integrally connected with a pinion 7a. The pinion 7a is engaged with a rack gear 11a of a rack shaft 11 which is disposed in a steering gear box 9 so as to be axially movable. An end of the rack gear 11 is directly connected to a right tie rod 15R, and the other end of the rack gear 11 is connected to a left tie rod 15L through a power cylinder 13 for assisting a front wheel steering. The right and left tie rods 15R and 15L are connected to the front wheels 2R and 2L through knuckles (not shown), respectively. Therefore, the rotational force generated by rotating the steering wheel 5 is converted in an axial force of the rack shaft 11 by means of the pinion shaft 7a and the rack shaft 11 in the steering gear box 9. This axial force functions to steer the front wheels 2R and 2L through the knuckles.

The power cylinder 13 is constituted by a piston rod 13a which is coaxially interconnected with the rack shaft 11, a piston 13b which is formed at an intermediate portion of the piston rod 13a and right and left pressure chambers 13R and 13L defined by the piston 13b which is slidable therein. The right and left pressure chamber 13R and 13L are in communication with a hydraulic pump 19 and a reservoir tank 20 through a rotary valve 17 which is disposed in the steering shaft 7 and supplies a flow rate corresponding to a direction and a magnitude of the steering torque generated in the steering system to the right and left chambers 13R and 13L. That is, a hydraulic steering assist-power generating mechanism is constituted by the power cylinder 13, the rotary valve 17, the hydraulic pump 19, the reservoir tank 20 and an electric motor 21.

Figure 2:
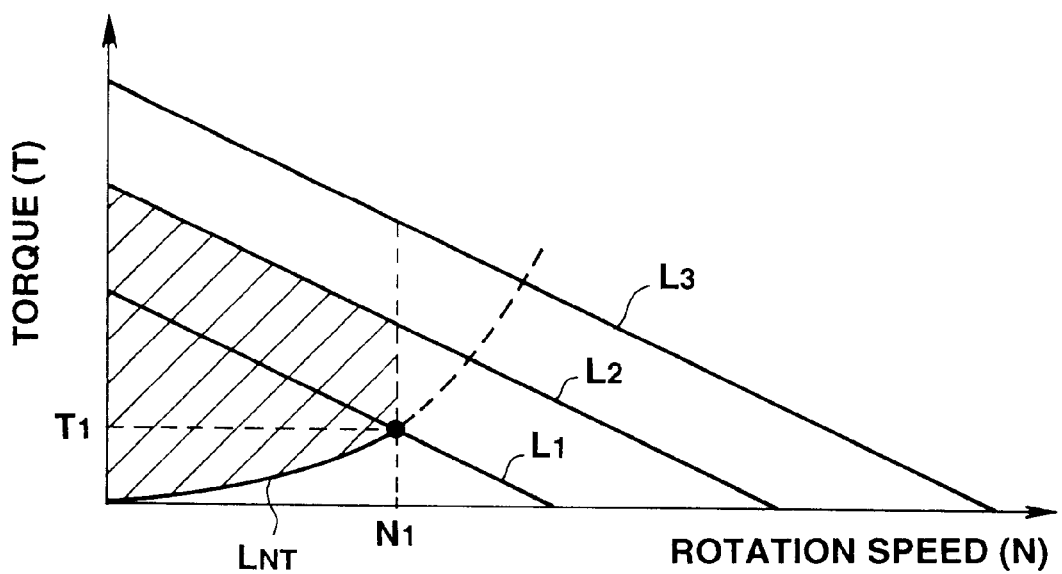
FIG. 2 is a graph which shows the characteristics of an electric motor for steering and a hydraulic pump for steering of FIG. 1.

The hydraulic pump 19 is driven by a dc electric motor 21 for the steering. The electric motor 21 is controlled by a controller 34 for steering so as to discharge a controlled amount of the hydraulic oil. Installed between the discharge side of the hydraulic pump 19 and the reservoir tank 20 is a relief valve (not shown) to restrict the maximum pressure to be supplied to the steering system. The electric motor 21 performs relationships between the rotation speed N and the input torque T as represented by characteristic lines $L_1$, $L_2$ and $L_3$ in 200V, 300V and 400V, respectively as shown in FIG. 2. When it is necessary that the rotation speed N is greater than a preset value $N_1$ and the input torque T to be applied to the hydraulic pump 19 is greater than a preset value $T_1$ in order to ensure a necessary torque for executing the steering, an acceleration time $t_1$, which is defined as a time period from a first time that the motor is stopped while the battery voltage $V_B$ is the rated voltage 300V to a second time that the motor is operated in the rotation speed $N_1$ and torque $T_1$, is adapted to the steering response characteristics. The acceleration time $t_1$ is determined by the size of the hatching marked area in FIG. 2, which is defined by the vertical axis, the line $L_2$, the pump input torque curve $L_{NT}$ and a line segment $L_N$ indicative of the rotation speed $N_1$ in FIG. 2. Therefore, When the battery voltage greater than the rated voltage 300V is applied to the electric motor 21, the acceleration time becomes smaller than the time period $t_1$. However, when the battery voltage to be applied to the electric motor 21 becomes smaller than the rated voltage 300V, the acceleration time becomes greater than the time period $t_1$. This increase of the acceleration time is caused by the decrease of the hatching area since the characteristic curve is shifted toward the line $L_1$, and therefore the steering responsiveness is degraded.

The control unit 30 comprises a battery unit 31 which is constituted by serially connecting twenty-five 12V rated-voltage lead-and-acid batteries. The battery unit 31 has 405V in full charged condition, 300V rated voltage and 200V in final discharging condition. This electric power of the battery unit 31 is supplied to the controller 32 for traveling, the drive circuit 33 for traveling, the controller 34 for steering and the drive circuit 35 for steering.

The controller 32 for traveling includes a converter for converting the battery voltage $V_B$ into a source voltage for control and a microcomputer. The controller 32 output a motor drive command value $C_{DM}$ for controlling the travel motor 3 according to a depression degree of an acceleration pedal (not shown) to a drive circuit 33 for traveling. The drive circuit 33 converts the dc voltage from the battery unit 31 into ac voltage by means of an inverter, and supplies the excitation voltage $V_{DM}$ according to the inputted motor drive command value $C_{DM}$ to the electric motor 3.

The controller 34 for steering includes a converter for converting the battery voltage $V_B$ into a source voltage for control and a microcomputer. The controller 34 is connected to a vehicle speed sensor 36 for detecting a vehicle speed $V_V$, a steer angle sensor 37 for detecting a steer angle θ and a voltage sensor 38 for detecting the battery voltage $V_B$ of the battery unit 31. The controller 34 obtains a motor drive command value $M_S$ by executing the processing shown in FIG. 3 on the basis of the obtained signals, such as the vehicle speed $V_V$, the steer angle θ and the battery voltage $V_B$.

The drive circuit 35 for steering generates pulse signals indicative of a duty ratio corresponding to the motor drive command value $M_S$ by executing the pulse width modulation (PWM) on the basis of the inputted motor drive command value $M_S$. The drive circuit 35 outputs the excitation voltage $V_{SM}$ to the electric motor 21 for steering by supplying the pulse signal to a thyristor chopper (not shown) to which the battery voltage $V_B$ is applied.

The manner of operation of the controller 34 for steering will be discussed with reference to the flowchart of FIG. 3.

Figure 3:
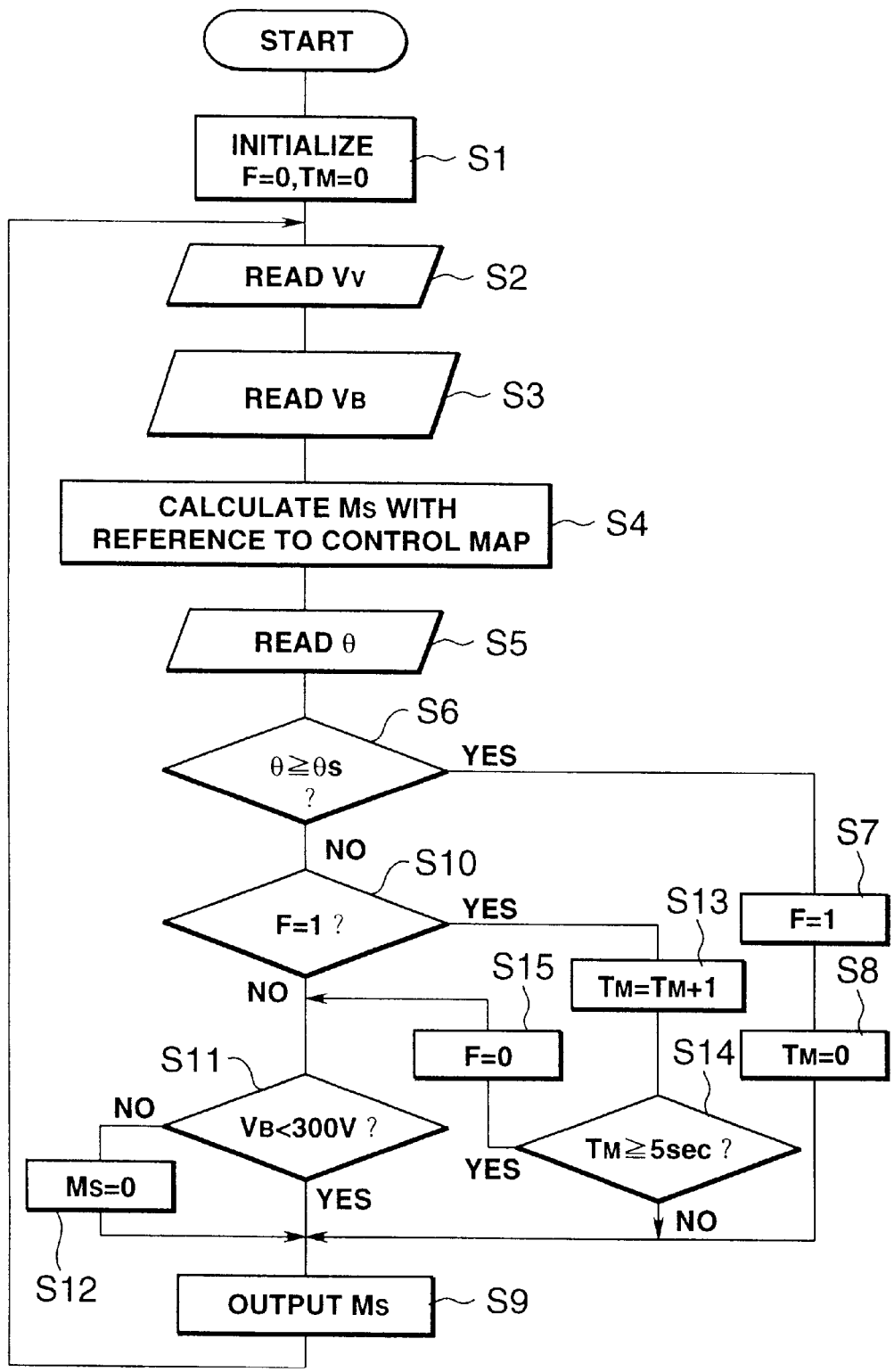
FIG. 3 is a flowchart which shows an electric-motor control procedure of a controller for steering in the first embodiment.

The processing of FIG. 3 is started by turning on an electric source switch SW.

At a step S1, the controller 34 for steering executes the initialization of a steer condition flag F indicative that the steer angle θ is greater than a predetermined value θs and a timer value $T_M$ indicative of a delay time for preventing hunting in case that the steer angle θ is changed from a value greater than the predetermined value θs to a value smaller than the predetermined value θs, that is, the steer condition flag F and the timer value $T_M$ are reset at 0(F=0, $T_M$=0).

At a step S2, the controller 34 reads the vehicle speed $V_V$ detected by the vehicle speed sensor 36.

At a step S3, the controller 34 reads the battery voltage $V_B$ detected by the voltage sensor 38.

Figure 4:
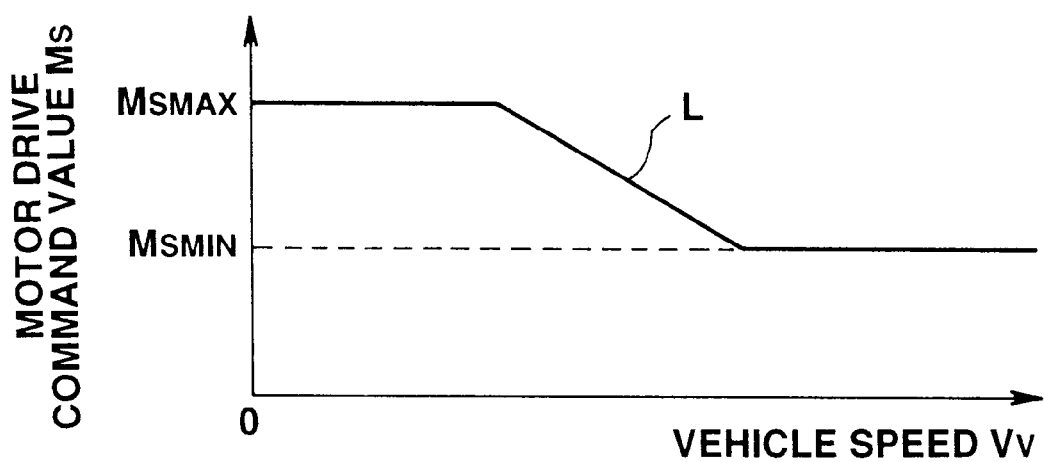
FIG. 4 is a graph which shows a control map indicative of a relationship between the motor drive command value and the vehicle speed.

At a step S4, the controller 34 calculates the motor drive command value $M_S$ for the electric motor 21 for steering on the basis of the vehicle speed and with reference to a control map of FIG. 4 and updates the obtained motor drive command value $M_S$ in a command value storing area of the RAM of the microcomputer of the controller 34. The control map shown in FIG. 4 is previously stored in the ROM of the microcomputer of the controller 34. As shown in FIG. 4, the controller 34 selects the characteristic curve L such that in the low speed range the motor drive command value $M_S$ is set at a maximum motor-drive command value $M_{SMAX}$ to increase the discharge amount of the hydraulic pump 19 regardless of the vehicle speed $V_V$, in the intermediate speed range the drive command value $M_S$ is gradually decreased from the maximum motor drive command value $M_{SMAX}$ according to the increase of the vehicle speed $V_V$, and in high speed range the drive command $M_S$ is set in the minimum motor drive command value $M_{SMIN}$ to decrease the discharge amount of the hydraulic pump 19 regardless of the vehicle speed $V_V$.

At a step S5, the controller 34 reads the steer angle θ detected by the steer angle sensor 37.

At a step S6, the controller 34 decides as to whether the previously set steer angle θ is greater than the predetermined value θs indicative of the reference value for deciding whether the vehicle is in the steered condition or not. When θ≧θ$_S$, that is, when the controller 34 decides that the vehicle is put in the steered condition, the routine proceeds to a step S7 wherein the steer condition flag F is set at 1 (F=1). When θ<θ$_S$, that is, when the controller 34 decides that the vehicle is not put in the steered condition, the routine proceeds to a step S10.

Following the step S7, at a step S8 the controller 34 resets the timer value $T_M$ for an anti-hunting timer to 0 ($T_M$=0).

Then, the routine proceeds to the step S9 wherein the controller 34 reads the motor drive command $M_S$ stored in the command value storing area and outputs it to the drive circuit 35 for steering. After the execution of the step S9, the routine returns to the step S2.

At the step S10, the controller 34 decides as to whether the steer condition flag F is set at 1 or not. When the steer condition flag F is set at 0 (F=0), that is, when the controller 34 decides that it is not a time that the steered condition has been just changed to the non-steered condition, the routine proceeds to a step S11 wherein the controller 34 decides as to whether the battery voltage $V_B$ is smaller than the predetermined value 300V or not. When the battery voltage $V_B$ is greater than or equal to the predetermined value 300V ($V_B \geq 300V$), that is, when the controller 34 decides that the battery voltage $V_B$ is not lowered, the routine proceeds to a step S12 wherein the controller 34 sets the motor drive command value $M_S$ at 0 to stop the electric motor 21 for steering. Following to the execution of the step S11, the routine returned to the step S9.

On the other hand, when the battery voltage $V_B$ is smaller than the predetermined value 300V ($V_B < 300V$), that is, when the controller 34 decides that the battery voltage $V_B$ is lowered, the routine returns to the step S9 to prohibit the stop of the electric motor 21 and to continue the rotational operation of the electric motor 21.

When the controller 34 decides at the step S10 that the steer condition flag F is set at 1 (F=1), that is, when the controller 34 decides that it is a time that the steered condition has been just changed to the non-steered condition, the routine proceeds to a step S13 wherein the controller 34 increments the timer value $T_M$ by 1 ($T_M = T_M + 1$).

Following to the execution of the step S13, the routine proceeds to a step S14 wherein the controller 34 decides as to whether the time value $T_M$ becomes greater than or equal to the predetermined time such as 5 seconds. When the timer value $T_M$ is greater than or equal to the predetermined value 5 seconds ($T_M \geq 5$ sec.), the routine proceeds to the step S15 wherein the controller 34 resets the steer condition flag F to 0 (F=0). Following to the execution of the step S15, the routine proceeds to the step S11. On the other hand, when the time value $T_M$ is not greater than or equal to the predetermined value 5 sec. ($T_M < 5$ sec.) at the step S15, the routine proceeds to the step S9.

This processing represented by the flowchart of FIG. 3 corresponds to the electric motor control means.

Assuming that the electric vehicle employing the power steering apparatus according to the present invention is stopping by turning off the electric source switch SW, the control unit 30 is put in an inoperative condition and the drive control of each of the electric motor 3 for traveling and the electric motor 21 for steering through the controller 32 for traveling and the controller 34 for steering is stopped. Therefore, if the electric source switch SW is turned on in this vehicle stop condition, the controller 32 for traveling, the drive circuit 33 for traveling, the controller 34 for steering and the drive circuit 35 for steering are turned on, and the electric motor 3 for traveling and the electric motor 21 for steering are put in an operative condition.

When an acceleration pedal (not shown) of the electric vehicle is depressed, the controller 32 for traveling outputs the motor drive command value $M_D$ in relation with the depression amount of the of the acceleration pedal to the drive circuit 33 for traveling. The drive circuit 33 supplies the electric power corresponding to the motor drive command value $M_D$ to the electric motor 3 for traveling to rotate the drive shaft 4b through the reduction gear 4a and therefore the front wheels 2R and 2L are rotated to start the traveling of the vehicle.

On the other hand, when the battery voltage $V_B$ of the battery unit 31 is higher than the rated voltage 300V, the controller 34 for steering executes the processing of FIG. 3 so that in the low speed range including a stopped condition the motor command value $M_S$ calculated on the basis of the vehicle speed $V_V$ and with reference to the control map of FIG. 4 takes the maximum value $M_{SMAX}$ and it is updated in the command value storing area.

In this situation, if the steering wheel 5 is put in a neutral position and in the inoperative condition, the steer angle θ is smaller than the predetermined value $θ_S$ ($θ < θ_S$) and the steer condition flag F is kept at 0. Therefore, the routine in the flowchart of FIG. 3 proceeds to the step S11 through the steps S6 and S10. At the step S11, the controller 34 decides that the battery voltage $V_B$ is greater than or equal to the rated voltage 300V since the battery unit 31 is put in a normal charged condition. Therefore, the routine proceeds to the step S12 wherein the motor drive command value $M_S$ is set at 0 and the set value is updated in the command value storing area. Therefore, the maximum value $M_{SMAX}$ stored at the step S4 is updated to 0. The motor drive command value $M_S$ outputted at the step S9 becomes 0 and the excitation voltage $V_S$ is not outputted from the drive circuit 35 for steering. Therefore, the electric motor 21 for steering is put in the stopped condition and the hydraulic pump 19 is also put in the stopped condition. That is, the supply of hydraulic oil to the rotary valve 17 is stopped and the generation of the assist-power by the power cylinder 13 is stopped. Accordingly, the energy consumption of the battery unit 31 at the controller 34 for steering becomes 0 and therefore the power saving of the electric vehicle is improved.

Then, if in the low speed range the steering wheel 5 is steered, for example, in the left hand direction, the steer angle θ detected by the steer angle sensor 37 becomes large. When the steer angle θ becomes greater than the predetermined value $θ_S$, the controller 34 decides that the vehicle is put in the steered condition and therefore the routine proceeds from the step S6 to the step S7 wherein the steer condition flag F is set at 1 (F=1). At the step S8 the timer value $T_M$ is reset ($T_M = 0$). Then, the routine proceeds to the step S9 wherein the maximum value $M_{SMAX}$ calculated at the step S4 is stored as the motor drive command value $M_S$ as it is, and the motor drive command value $M_S$ is outputted to the drive circuit 35 for steering.

Therefore, the battery voltage $V_B$ (performing 100% duty ratio) is supplied from the drive circuit 35 for steering to the electric motor 21 for steering, and the electric motor 21 starts to rotate. Since the hydraulic pump 19 is started to operate according to the start of the electric motor 21, the discharge amount of the hydraulic is gradually increased so that the electric motor 21 performs the rotation speed $N_1$ and the input torque $T_1$ within the predetermined time period $t_1$. Therefore, a preferable steering responsiveness is ensured.

Further, since the opening degree of the rotary valve 17 is controlled according to the steering torque inputted to the steering wheel 5, the hydraulic fluid discharged from the hydraulic pump 19 is supplied to the left pressure chamber 13L of the power cylinder 13 through the rotary valve 17 and therefore the steering assist-power for moving the rack shaft 11 in the right hand direction according to the amount of the supplied hydraulic oil. Therefore, the front wheels 2R and 2L are steered in the left hand side with the aid of the steering assist power.

When the battery unit 31 is put in the normal charged condition and when the vehicle speed $V_V$ is put in the intermediate condition, the motor drive command value $M_S$ is decreased from the maximum value $M_{SMAX}$ according to the increase of the vehicle speed $V_V$. Further, when the vehicle speed $V_V$ becomes higher and is set in the high speed range, the motor drive command value $M_S$ becomes the minimum value $M_{SMIN}$ and therefore the steering assist power generated by the power cylinder 13 becomes minimum to certainly prevent the necessary steering force of the steering wheel 5 from becoming too small during the high speed traveling. Thus, when the battery unit 31 is put in the normal charged condition, the power steering apparatus according to the present invention ensures the preferable steering responsiveness at a steering start condition even if the electric motor 21 for steering is started from a stopped condition. When the steering wheel 5 is returned to the neutral position to execute straight traveling after the turning, the routine in the flowchart proceeds from the step S6 to the step S10. Since the steer condition flag F is set at 1 (F=1), the routine proceeds to the step S13 wherein the timer value $T_M$ is incremented by 1 ($T_M = T_M + 1$). Until the timer value $T_M$ reaches 5 seconds, the motor drive command value $M_S$ calculated at the step S4 is maintained. When the timer value $T_M$ reaches 5 seconds, the routine proceeds from the step S14 to the step S15 wherein the steer condition flag F is reset (F=0). Following this, the routine proceeds through the step S11 to the S12 wherein the motor drive command value $M_S$ is reset ($M_S$=0) to stop the electric motor 21 for steering. When the turning of the vehicle is again executed within 5 seconds after the change from the turning condition to the straight traveling condition, the steer condition flag F is kept at 1 (F=1). Therefore, the rotation of the electric motor 21 for steering is continued since the routine does not proceed to the step S12.

On the other hand, if the processing of FIG. 3 is executed in case that the battery voltage $V_B$ of the battery unit 31 becomes lower than the rated voltage 300V, that is, in case that the battery unit 31 is put in the low voltage condition, the battery voltage $V_B$ is checked at the step S11 after the predetermined time 5 seconds elapsed from the change to the non-steered condition from the steered condition or just after the electric source switch SW is turned on, that is, when the steer condition flag F is just reset (F=0). Therefore, the routine certainly proceeds from the step S11 to the step S9, and the driving of the electric motor 21 is not stopped in this situation.

As a result, since the change from the stopped condition to the driving condition of the electric motor 21 is prohibited in the condition that the battery voltage $V_B$ is lowered, the lowering of the steering responsibility caused by the delay of the acceleration time is certainly prevented without enlarging the size of the electric motor 21 for steering.

If it is desired to keep the acceleration time within the time $t_1$ in a condition that the battery voltage VB is 200V, it is necessary to use an electric motor which performs the characteristic represented by the curve at the rated voltage 300V of FIG. 2 in a condition that the battery voltage $V_B$ is 200V. This requires the size-up of the electric motor for steering.

Figure 5:
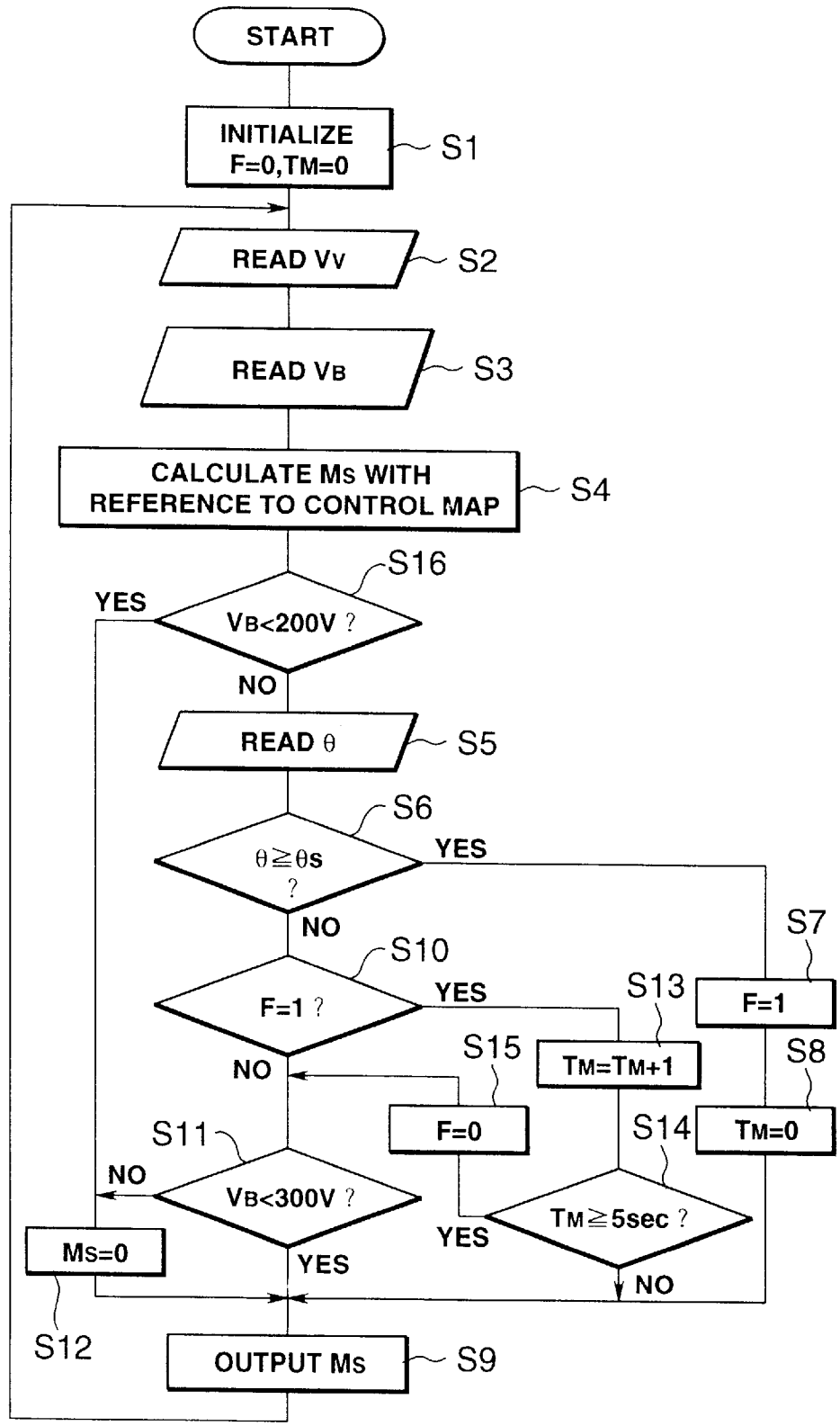
FIG. 5 is a flowchart which shows the motor control procedure of a modification of the first embodiment.

Although the first embodiment of the power steering apparatus according to the present invention has been shown and described such that the electric motor 21 is continuously driven by prohibiting the stop of the motor 21 in a condition that the battery voltage $V_B$ is lower than the rated voltage 300V, it will be understood that the prohibiting rule may be changed as shown in FIG. 5 such that the drive of the motor 21 is prohibited by setting the motor drive command value $M_S$ to 0 when the battery voltage $V_V$ becomes lower than 200V to suppress the lowering of the battery voltage $V_B$.

That is, the manner of operation of the controller 34 shown in FIG. 4 may be modified as shown in a modification of FIG. 5. In the flowchart of FIG. 5, a step S16 for deciding as to whether the battery voltage $V_B$ is lower than a preset voltage 200V or not is inserted between the steps S4 and S5 of FIG. 3. When the decision at the step S16 is $V_B$<200V, the routine proceeds to the step S12. When the decision at the step S16 is $V_B \geq 200V$, the routine moves to the step S5. The other steps of this modification of FIG. 5 are the same as those shown in FIG. 3. The steps of FIG. 5 corresponding to those of FIG. 3 are designated by the same reference numerals and their explanations are omitted herein.

With this processing of FIG. 5, when the battery voltage $V_B$ is greater than or equal to 200V, this modification of the power steering apparatus ensures the advantageous functions as same as that of the first embodiment. Further, when the battery voltage $V_B$ becomes smaller than 200V, the motor drive command value $M_S$ is forcibly set at 0. Therefore, the power supply to the electric motor 21 for steering from the motor drive circuit 35 for steering is stopped to stop the drive of the electric motor 21 regardless of the steered degree of the steering wheel 5. This control decreases the power consumption of the battery unit 31 at the drive circuit 35 and therefore the further lowering of the battery voltage $V_B$ of the battery unit 31 is suppressed.

Figure 6:
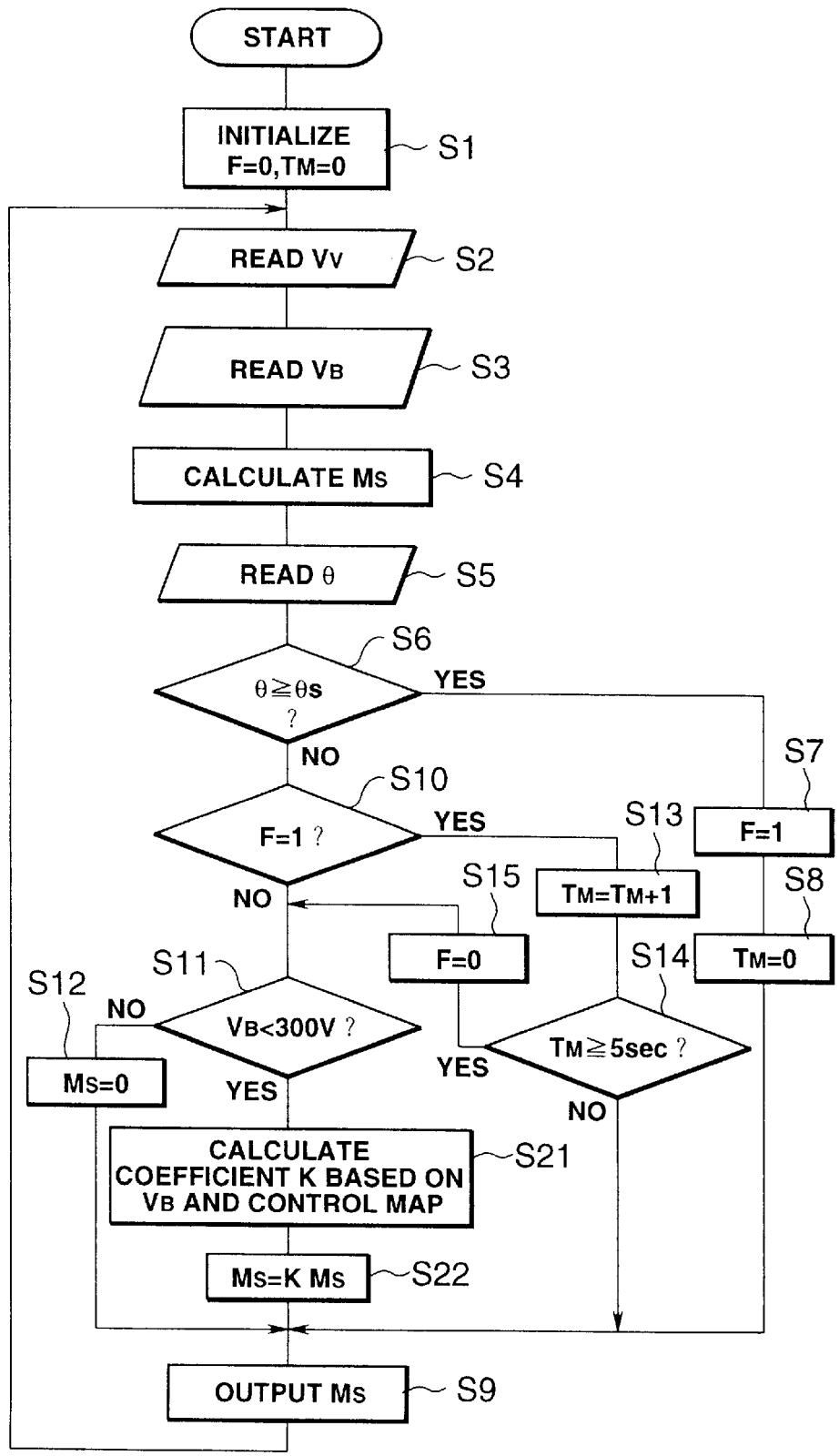
FIG. 6 is a flowchart which shows the motor control procedure of a second embodiment.
Figure 7:
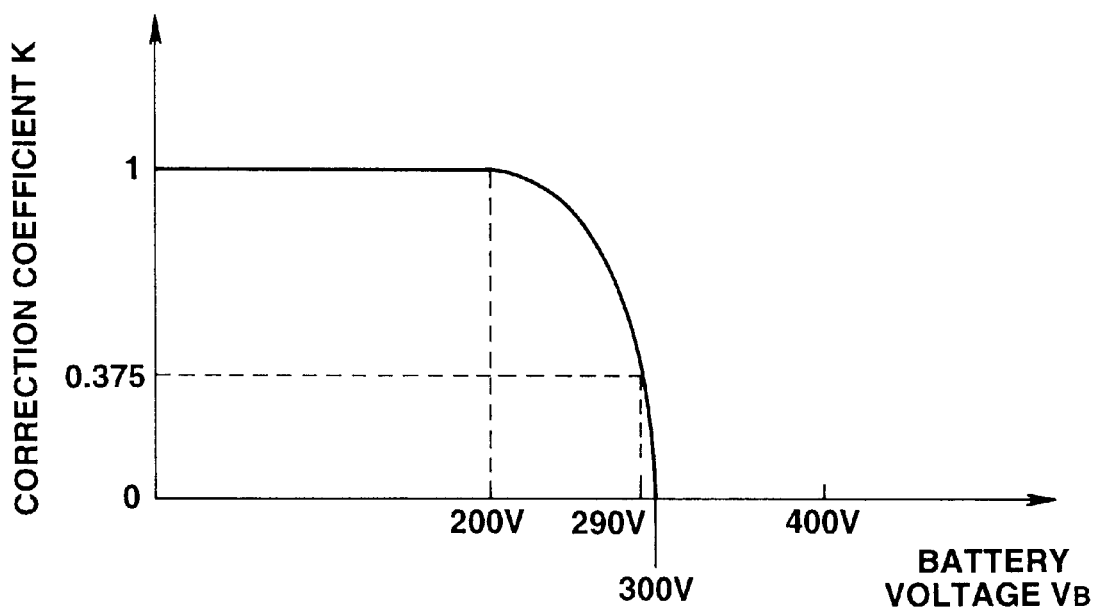
FIG. 7 is a graph which shows a control map indicative of the relationship between correction coefficient and the battery voltage in the second embodiment.

Referring to FIGS. 6 and 7, there is shown a second embodiment of the power steering apparatus for electric vehicle in accordance with the present invention.

The second embodiment is the same as the first embodiment except that the operation of the electric motor 21 for steering in the battery-voltage lowered condition is changed according to the battery voltage $V_B$.

As shown in FIG. 6, a step S21 for calculating a correction coefficient K and a step S22 for updating the motor drive command value $M_S$ are inserted between the steps S11 and S9. At the step S21, the controller 34 calculates the correction coefficient K for the motor drive command value $M_S$ on the basis of the battery voltage $V_B$ and with reference to a correction-coefficient control map which is previously stored in the ROM of the microcomputer of the controller 34. At the step S22, the controller 34 updates the motor drive command value $M_S$ by multiplying the correction coefficient K obtained at the step S21 with the motor drive command value MS stored in the command value storing area ($M_S$= K·$M_S$). The other operations of the flowchart in FIG. 6 are the same as those in FIG. 3. The same steps of FIG. 6 are designated by the same reference numerals of FIG. 3 and their explanations are omitted herein.

As shown in FIG. 7, in the correction coefficient control map, when the battery voltage $V_B$ is smaller than 200V, the correction coefficient K is set at 1 (K=1). When the battery voltage $V_B$ is within a range from 200V to the rated voltage 300V, the correction coefficient K is decreased according to the increase of the battery voltage $V_B$ to form a parabolic curve, and the correction coefficient K takes 0 at the rated voltage 300V.

With this second embodiment, when the battery voltage $V_B$ is greater than or equal to the rated voltage 300V and the vehicle is put in the non-steered condition (F=0), the routine proceeds from the step S11 to the step S12 to stop the electric motor 21 for steering. This operation ensures the functions as same as those in the first embodiment. On the other hand, when the battery voltage $V_B$ becomes smaller than the rated voltage 300V, the routine proceeds from the-step S11 to the step S21 where the correction coefficient K is calculated on the basis of the battery voltage $V_B$ and the control map of FIG. 7. Therefore, if the battery voltage $V_B$ is lowered and takes 290V slightly smaller than the rated voltage 300V, the correction coefficient K takes 0.375. The obtained correction coefficient 0.375 is multiplied with the motor drive command value $M_S$ stored in the command value storing area to set the new motor drive command value $M_S$ ($M_S=K \cdot M_S$). Therefore, the new motor drive command value $M_S$ is restricted to three-eighths of the motor drive command value $M_S$ calculated at the step S4.

In this condition, the electric motor 21 for steering is rotated at a lower speed as compared with the necessary rotation speed $N_1$ and the discharge amount of the hydraulic pump 19 is small. When the steer angle θ becomes greater than the predetermined value $θ_S$ (from non-steered condition to the steered condition), the motor drive command value $M_S$ calculated at the step S4 is outputted to the drive circuit 35 for steering so as to ensure the necessary rotation speed $N_1$ and the input torque $T_1$ within the predetermined acceleration time $t_1$. This improves the consumption of the electric power while the preferable steering responsiveness is ensured. Therefore, the load to the battery is decreased as compared with the first embodiment.

The correction coefficient K approaches 1 according to the lowering of the battery voltage $V_B$ and is fixed at 1 when the battery voltage $V_B$ becomes smaller than or equal to 200V to output the motor drive command value $M_S$ calculated at the step S4 to the drive circuit 34 as it is. Therefore, the electric motor 21 for steering continues to rotate while maintaining the rotation speed $N_1$ and the output torque $T_1$ which are necessary for the steering operation.

Figure 8:
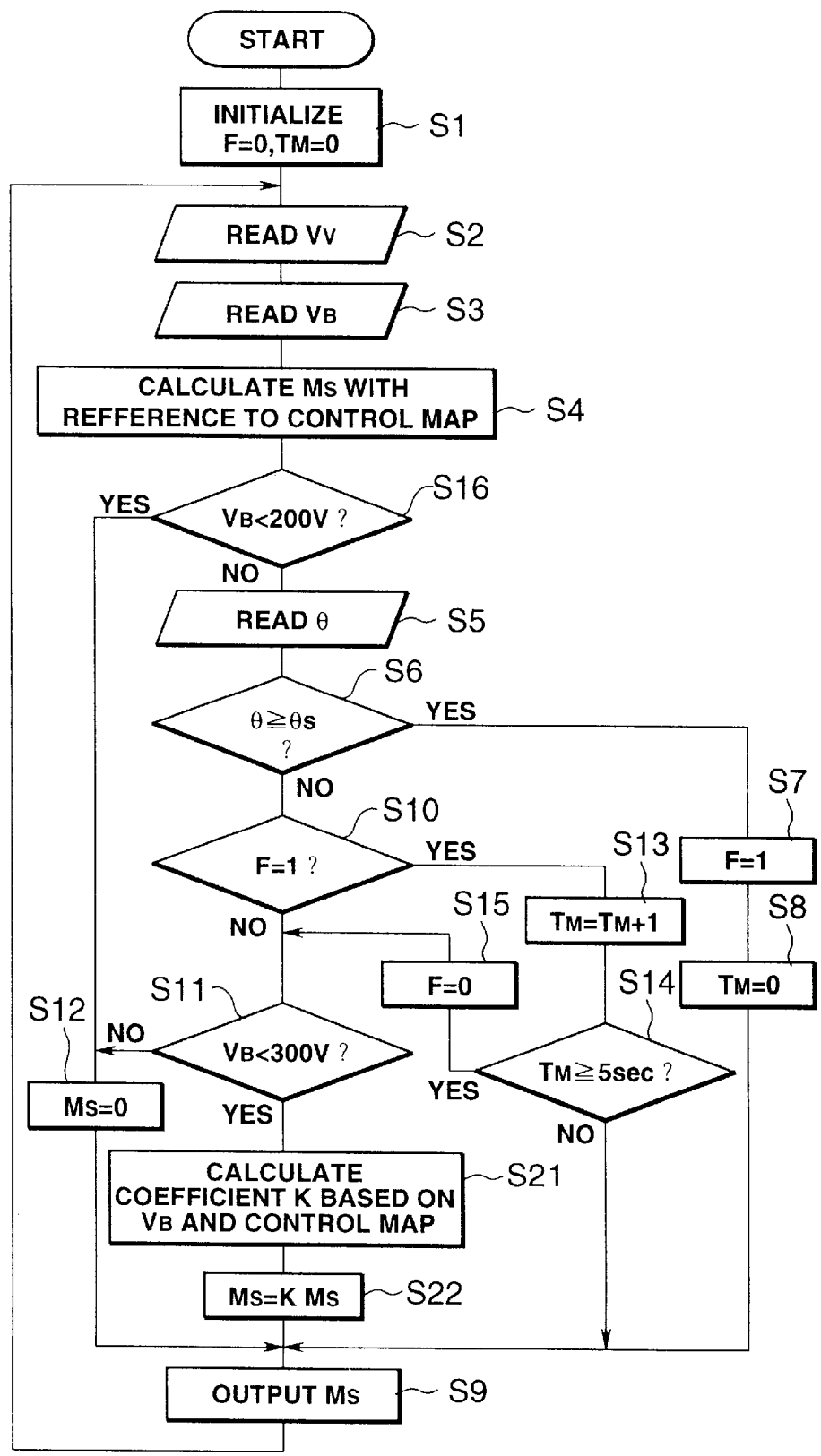
FIG. 8 is a flowchart which shows the motor control procedure of a modification of the second embodiment.

Although the second embodiment according to the present invention has been shown and described such that the correction coefficient K is changed to decrease the energy consumption when the battery voltage $V_B$ becomes smaller than 300V while continuing the rotation of the electric motor 21 for steering, it will be understood that the step S16 for deciding as to whether the battery voltage $V_B$ is smaller than 200V or not may be inserted between the steps S4 and S5 of FIG. 6 to further decrease the energy consumption of the battery unit 31 by stopping the electric motor 21 when the battery voltage $V_B$ becomes lower than 200V, as shown in FIG. 8.

Figure 9:
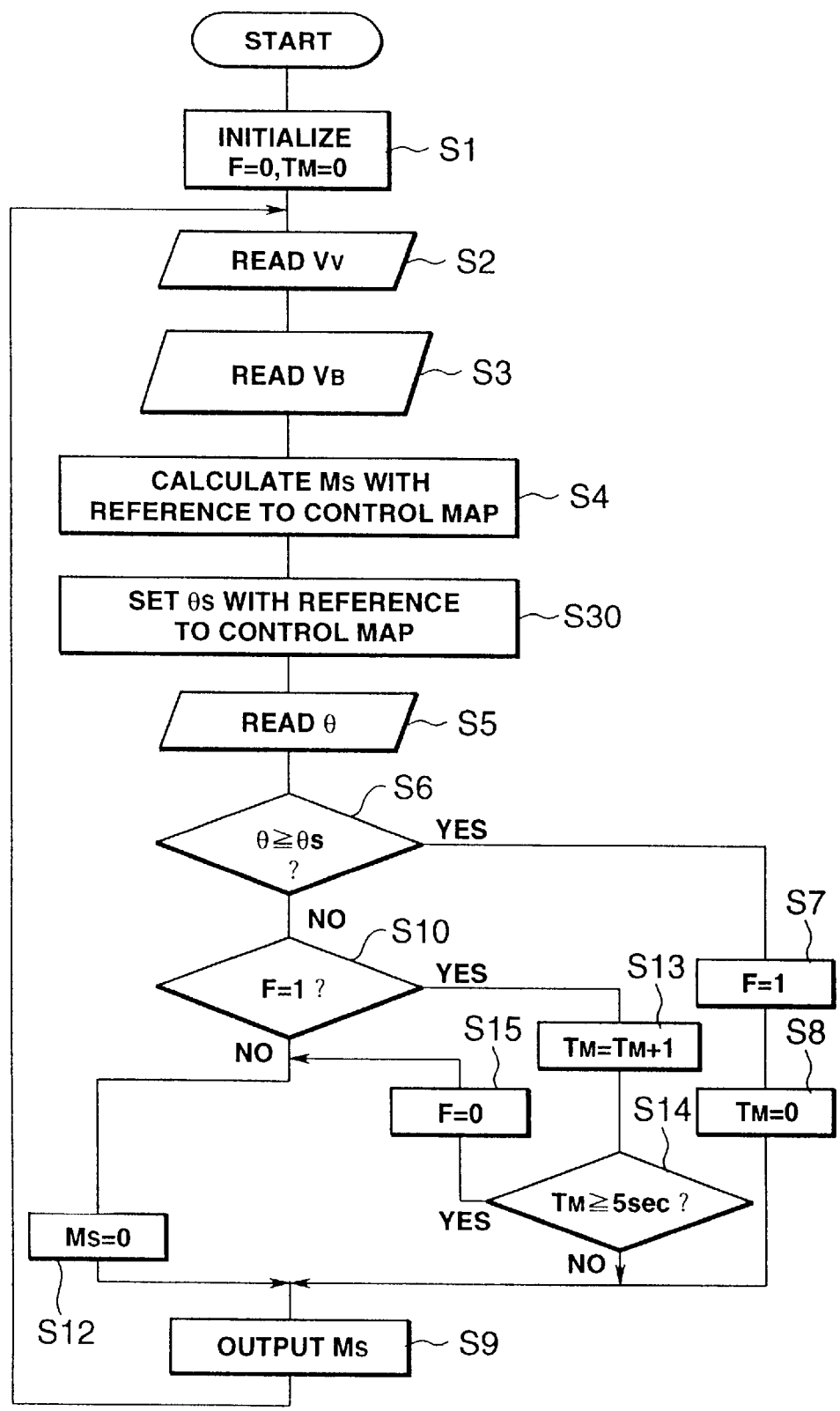
FIG. 9 is a flowchart which shows the motor control procedure of a third embodiment.
Figure 10:
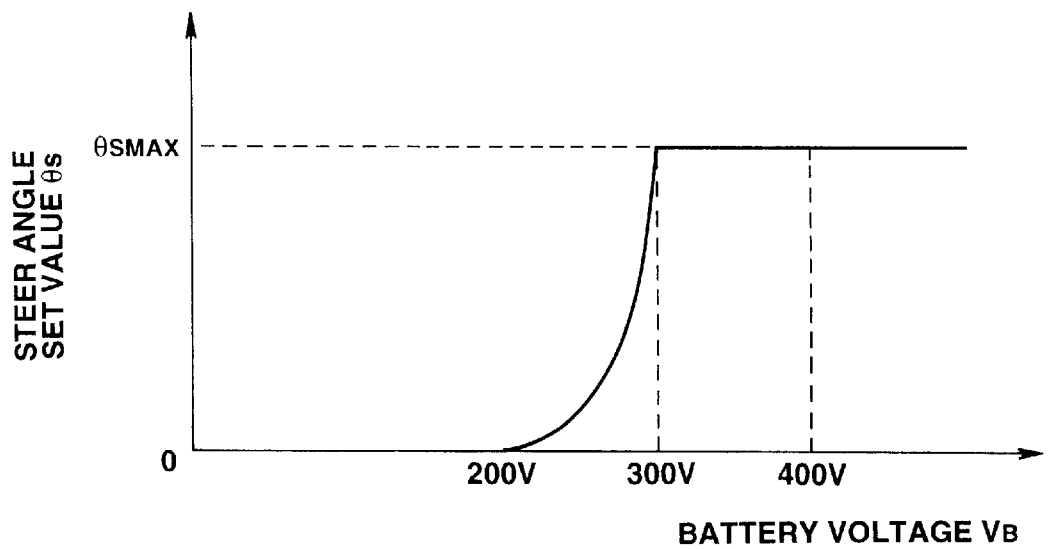
FIG. 10 is a graph which shows a steering angle set value control map indicative of the relationship between the steer angle set value and the battery voltage.

Next, referring to FIGS. 9 and 10, there is shown a third embodiment of the power steering apparatus according to the present invention. The third embodiment is arranged such that when the electric motor 21 for steering is put in the battery-voltage lowered condition the steer angle set value $θ_S$ is changed according to the battery voltage $V_B$.

As shown in FIG. 9, the control processing of the electric motor 21 for steering further includes a step S30 for setting the steer-angle set value $θ_S$ on the basis of the battery voltage $V_B$ and with reference to a steer-angle set-value control map shown in FIG. 10. The step S30 is inserted between the steps S4 and S5 of the flowchart shown in FIG. 3. At the step S6 the controller 34 for steering decides the steered condition on the basis of the steer angle set value $θ_S$ set at the step S30. The same steps as those of FIG. 3 are designated by the same numerals of FIG. 3, and the explanations thereof are omitted herein.

As shown in FIG. 10, the steer-angle set-value control map represents the relationship between the steer-angle set-value $θ_S$ and the battery voltage $V_B$ such that the steer-angle set-value $θ_S$ is set at $θ_{SMAX}$ when the battery voltage $V_B$ is greater than and equal to the rated voltage $V_B$, the steer-angle set-value $θ_S$ is set so as to be decreased to form a parabolic curve according to the decrease of the battery voltage $V_B$ when the battery voltage $V_B$ is smaller than 300V, and the steer-angle set-value $θ_S$ is set at 0 when the battery voltage $V_B$ becomes smaller than 200V.

With this arrangement of the third embodiment according to the present invention, when the battery voltage $V_B$ is greater than or equal to the rated voltage 300V, the controller 34 sets the steer-angle set-value $θ_S$ at $θ_{SMAX}$. Therefore, in the steered condition (F=1) the controller 34 controls the electric motor 21 for steering to rotate it according to the vehicle speed $V_V$ by outputting the drive command value $M_S$ calculated at the step S4 to the drive circuit 35, and in the non-steered condition (F=0) the controller 34 controls the electric motor 21 to stop it by resetting the motor drive command value $M_S$ at 0. On the other hand, when the battery voltage $V_B$ becomes smaller than the rated voltage 300V, the steer-angle set-value $θ_S$ calculated at the step S4 is radically decreased according to the decrease of the battery voltage $V_B$ as shown in FIG. 10. Therefore, the area of the steered condition decided at the step S6 is increased, and the area of the non-steered condition is decreased. This decreases the frequency of the stopped conditions of the electric motor 21 and enables an area lowered in the steering responsiveness to be decreased. The decrease of the lowered area of the steering responsiveness lowered area due to the lowering of the battery voltage $V_B$ radically increases the area where the sufficient steer responsiveness is ensured. Further, when the battery voltage $V_B$ becomes 200V, the steer-angle set-value $θ_S$ is set at 0. Therefore, the controller 34 decides at the step S6 that the vehicle is put in the steered condition (F=1) in this situation. Accordingly, the controller 34 controls the electric motor 21 to continue the rotation of the electric motor 21 on the basis of the motor drive command value calculated at the step S4 so as to prohibit the stop of the electric motor 21.

Figure 11:
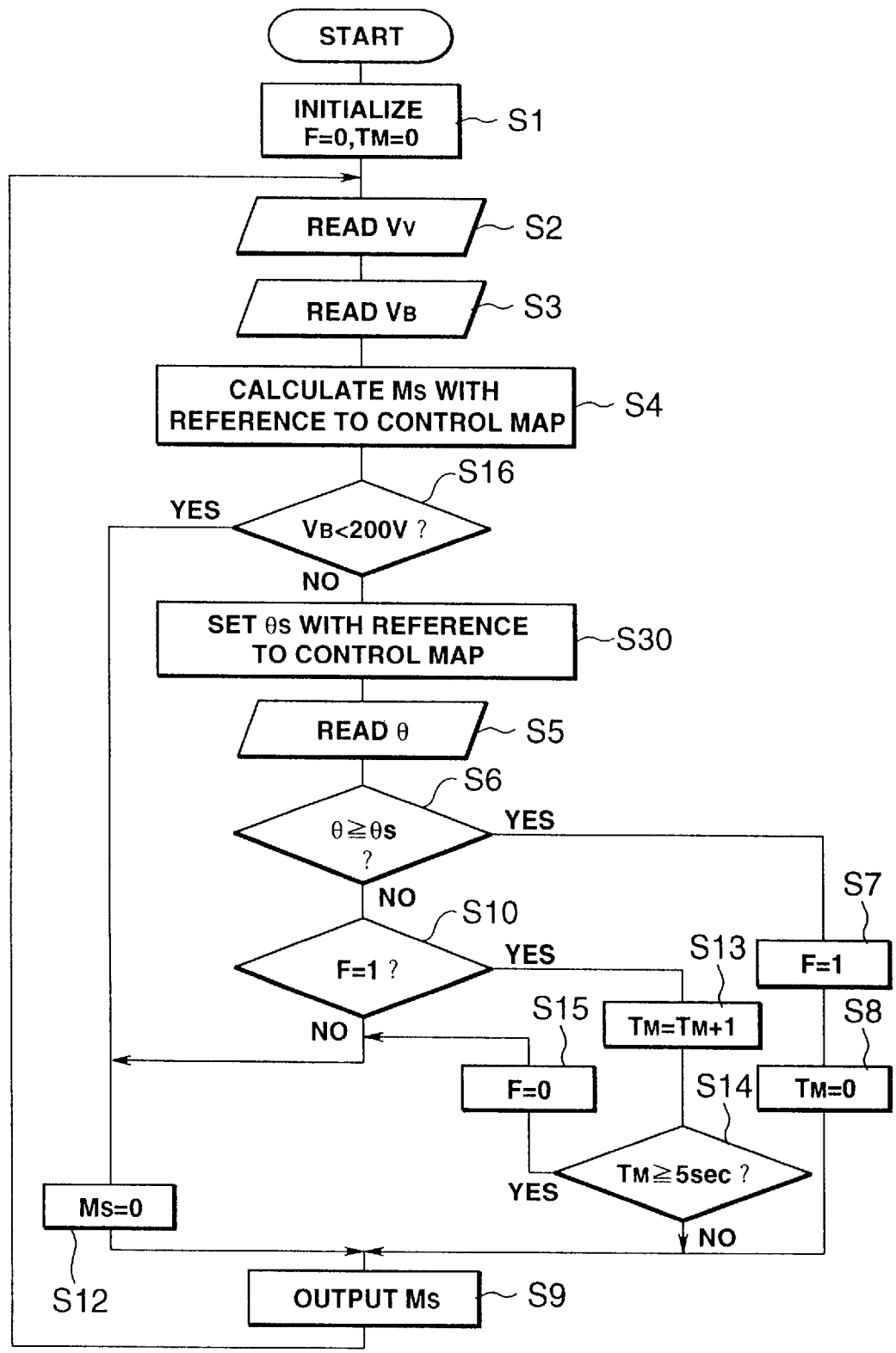
FIG. 11 is a flowchart which shows the motor control procedure of a modification of the third embodiment.

Although the third embodiment of this invention has been shown and described such that when the battery voltage $V_B$ becomes smaller than 300V the controller 34 decreases the stopped area where the electric motor 21 is stopped by decreasing the steer angle set value $θ_S$, it will be understood that instead of this control a step S16 for deciding as to whether the battery voltage $V_B$ is smaller than 200V or not may be inserted between the steps S4 and S30 of FIG. 9 as shown in FIG. 11. By this insertion of this step S16, when the battery voltage $V_B$ becomes smaller than 200V, the electric motor 21 is completely stopped to decrease the energy consumption of the battery unit 31.

Figure 12:
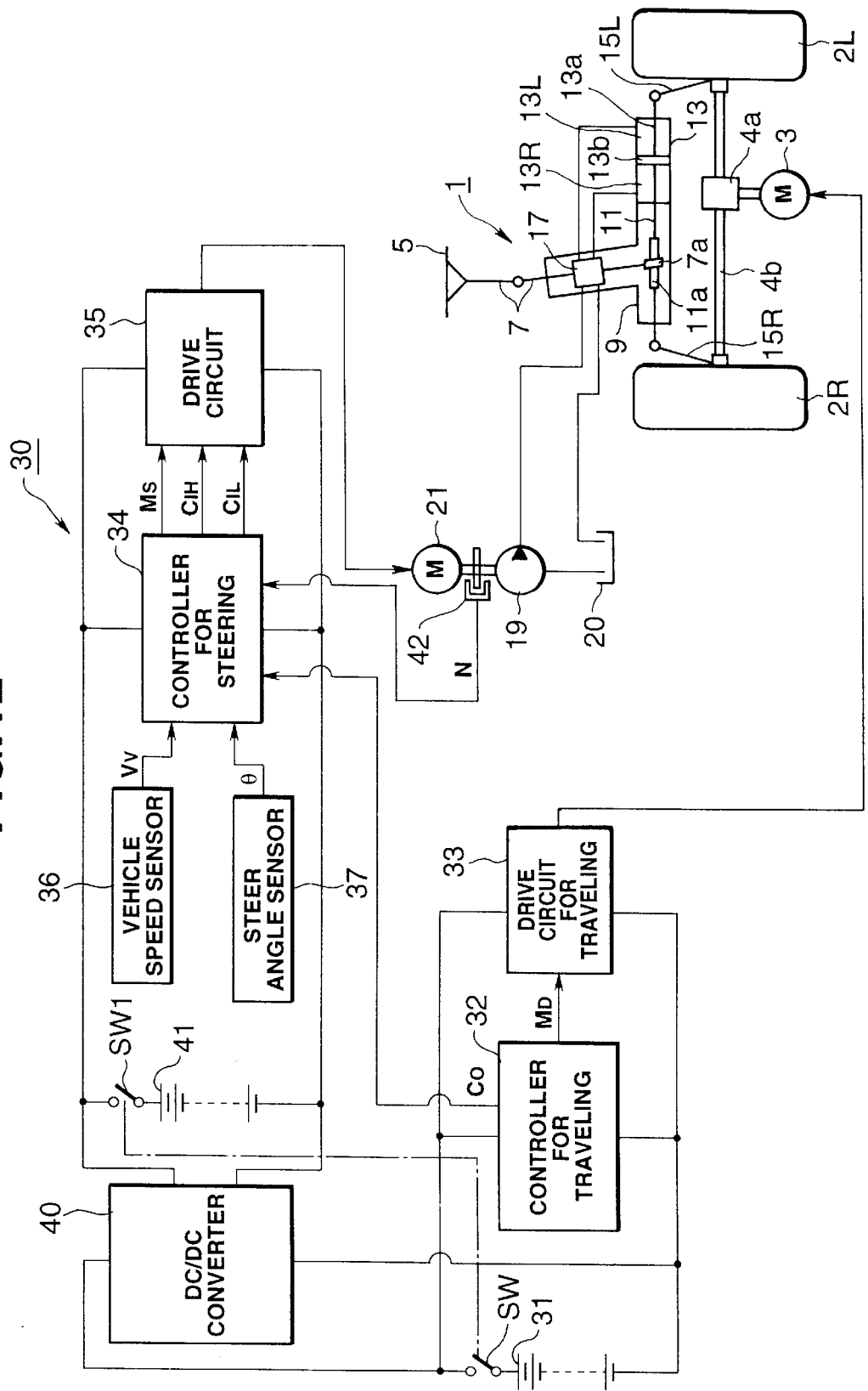
FIG. 12 is a schematic structural view showing a fourth embodiment of the power steering apparatus according to the present invention.
Figure 13:
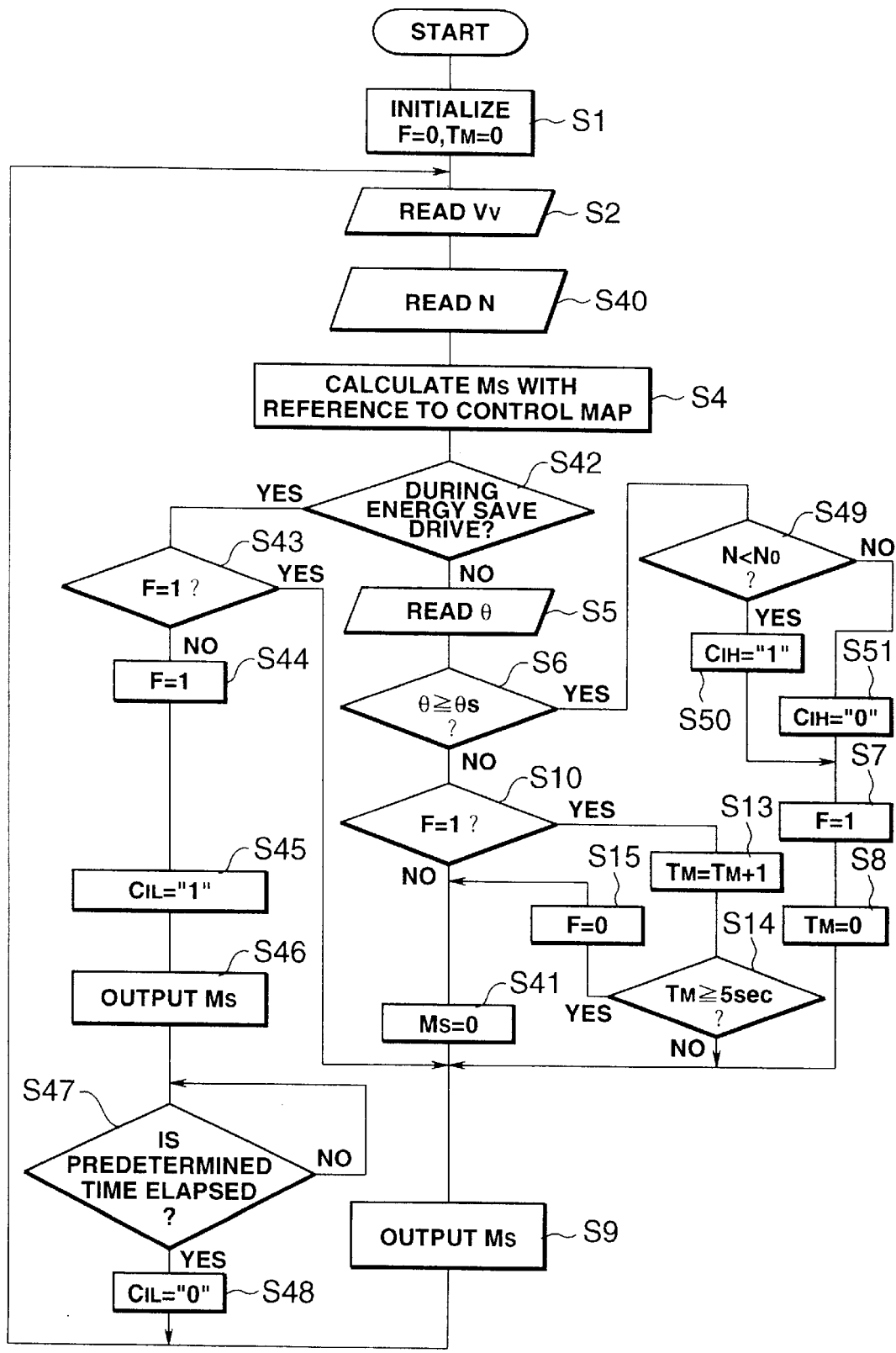
FIG. 13 is a flowchart which shows an electric-motor control procedure of a controller for steering in the fourth embodiment.

Referring to FIGS. 12 and 13, there is shown a fourth embodiment of the power steering apparatus according to the present invention. The construction of the fourth embodiment is generally similar to that of the first embodiment except that an auxiliary battery unit 41 for auxiliary machines including the power steering mechanism is provided. The auxiliary battery unit 41 is charged from the battery unit 31 for traveling. By this provision of the auxiliary battery unit 41, even when the battery voltage $V_{BD}$ is lowered, the electric motor 21 for steering is rotated without affecting the battery unit 31 for traveling.

As shown in FIG. 12, the control unit 30 is arranged such that the controller 32 for traveling and a DC/DC converter 40 are connected to the battery unit 31 for traveling through the electric source switch SW in parallel. The DC/DC converter 40 functions to convert the battery voltage $V_D$ set at the rated voltage 300V to 12V. The DC/DC converter 40 is connected to the auxiliary battery unit 41 performing the rated voltage 12V to supply the converted voltage 12V to the auxiliary battery unit 41 and to always put the auxiliary battery unit 41 in a full charged condition by means of the float charging. The controller 34 for steering and the drive circuit 35 for steering are connected in parallel to the auxiliary battery unit 41 through an interlocking switch SW1 interlocked with the electric source switch SW such that the excitation electric current outputted from the drive circuit 35 is supplied to the electric motor 21 for steering which is constituted by a low-voltage type brushless direct current motor.

The controller 32 for traveling monitors the battery voltage $V_{BD}$ and the discharged condition of the battery unit 31 for steering and controls the consumption of the battery unit 31 according to the monitored battery voltage and the monitored discharged condition. That is, when both of the monitored values of the battery voltage and the discharged condition are higher than the respectively preset values, the controller 32 controls the electric motor 3 for traveling to execute a normal control mode where the electric power of the battery unit 31 for traveling is fully applied to the electric motor 3. When either monitored value of the battery voltage or the discharged condition is smaller than each preset value, the controller 32 controls the electric motor 3 for traveling to execute an energy-saving control mode where the electric power of the battery unit 31 for traveling is used as little as necessary in order to prevent the over-charging of the battery unit 31. The controller 32 sets an energy-saving mode signal $C_0$ to 1 and outputs it to the controller 34 for steering, when the control mode is changed from the normal control mode to the energy-saving mode.

The controller 34 for steering reads the rotation speed N of the output shaft of the electric motor 21 through an encoder 42 for detecting the rotation speed N instead of the electric voltage sensor 38. The controller 34 executes the processing of FIG. 13. The controller 34 decides as to whether the energy-save mode signal $C_0$ is set at a logical value 1 or not upon reading the energy-save mode signal $C_0$ from the controller 32 for traveling. When the energy-save mode signal $C_0$ is set at the logical value 0, that is, when the vehicle is put in the normal control mode (not in the energy-saving mode), the controller 34 determines the motor drive command value $M_S$ on the basis of the vehicle speed V detected by the vehicle speed sensor 36 and the steer angle θ detected by the steer angle sensor 37. In the low rotation speed range, the controller 34 for steering sets the current limiting signal $C_{IH}$ at the logical value 1 and outputs it to the drive circuit 35 because the counter-electromotive force is small. In the high rotation speed range, the controller 34 sets the current limiting signal $C_{IH}$ at the logical value 0 and outputs it to the drive circuit 35. When the energy-save mode signal $C_0$ is set at the logical value 1, that is, when the vehicle is put in the energy save mode, the controller 34 controls the electric motor 21 put in the rotation to continue its rotation, and the controller 34 controls the electric motor 21 put in the stopped condition to start the electric motor 21 in the current limited condition by outputting the current limiting signal $C_{IL}$ set at 1 and by gradually increasing the motor drive command value $M_S$ to the motor drive command value $M_S$ calculated on the basis of the vehicle speed $V_V$.

The drive circuit 35 for steering supplies the drive power having a relatively high current value $I_N$ to the electric motor 21 when both of the current limiting signals $C_{IH}$ and $C_{IL}$ are set at 0. When the current limiting value $C_{IH}$ is set at 1, the drive circuit 35 supplies the drive power limited by the relatively large limit current value $I_H$, which is smaller than the normal current value $I_N$, to the electric motor 21. When the current limiting value $C_{IL}$ is set at 1, the drive circuit 35 supplies the drive power limited by the current limiting value $I_L$, which is generally a half of the normal current value $I_N$, to the electric motor 21.

The manner of operation shown by the flowchart of FIG. 13 will be discussed hereinafter.

The processing for steering operation executed by the controller 34 of the fourth embodiment is different from that of the first embodiment shown in FIG. 3 as mentioned hereinafter. A step S40 for reading the rotation speed N detected by the encoder 42 is installed instead of the step S3. The steps S11 and S12 are omitted and a step S41 for setting the motor-drive command value $M_S$ at 0 is installed to follow-the step S10 and the step S15. A step S42 for deciding as to whether the energy-save operation is executed or not on the basis of the energy-save mode signal C0 is installed between the steps S4 and S5.

When the decision at the step S42 is "NO", that is, when the energy save mode is not executed, the routine proceeds to the step S5. When the decision at the step S42 is "YES", the routine proceeds to the step S43, the routine proceeds to a step S43 wherein the controller 34 decides as to whether the steer condition flag F is set at 1 or not. When the decision at the step S43 is "YES" (F=1), the routine proceeds to the step S9. When the decision at the step S43 is "NO" (F=0), the routine proceeds to a step S44 where the steer condition flag F is set at 1 (F=1).

Following the execution of the step S44, the routine proceeds to a step S45 wherein the controller 34 outputs the current limiting command signal $C_{IL}$ set at the logical value 1 to the drive circuit 35. Following this, the routine proceeds to a step S46 where the controller 34 outputs the motor drive command value $M_S$ calculated at the step S4 to the drive circuit 35.

At a step S47, the controller 34 decides as to whether a predetermined time, which is generally similar to the acceleration time from a start time to the rated speed condition of the electric motor 21 for steering, elapsed or not. When the decision at the step S47 is "NO", the routine proceeds to a step S48 wherein the current limiting command value $C_{IL}$ is set at the logical value 0 and then returns to the step S2.

A step S49 for deciding as to whether the rotation speed N is smaller than the necessary rotation speed $N_1$ and is smaller than the upper-limit set speed $N_0$ where the counter electromotive voltage is kept small. When N<$N_0$ at the step S49, the routine proceeds to a step S50 wherein the controller 34 sets the current limiting signal $C_{IH}$ at the logical value 1. When the decision at the step S49 is "NO" (N≧$N_0$), the routine proceeds to a step S51 wherein the controller 34 sets the current limiting signal $C_{IH}$ at 0. After the execution of the step S50 or S51, the routine proceeds to the step S7 where the steer condition flag F is set at 1 (F=1).

Therefore, assuming that the electric source switch SW is turned on in a case that the vehicle is put in a stopped condition where the electric source switch SW and the interlocking switch SW1 are put in the turned-off condition and that the battery voltage $V_{BD}$ and the charged condition of the battery unit 31 are higher than the respective preset values, by turning on the electric source switch SW, the battery voltage $V_{BD}$ of the battery unit 31 is supplied to the controller 32 for traveling and the drive circuit 33 for traveling, and the battery voltage $V_{BS}$ of the auxiliary battery unit 41 is supplied to the controller 34 for steering and the drive circuit 35 for steering. In this condition, the float charging to the auxiliary battery unit 41 is executed through the DC/DC converter 40.

Since the battery voltage $V_{BD}$ and the charged condition of the battery unit 31 are greater than the respective predetermined values, the controller 32 for traveling executes the normal control mode where it is possible to fully use the electric power of the battery unit 31 and supplies the power save mode signal $C_0$ set at 0 to the controller 34 for steering.

By depressing the acceleration pedal in the vehicle stopped condition, the controller 32 for traveling outputs the motor drive command value $M_D$ according to the depression degree of the acceleration pedal to the drive circuit 33, and the drive circuit 33 for traveling outputs the electric power corresponding to the motor drive command value $M_D$ to the electric motor 3 for traveling. Therefore, the electric motor 3 for traveling is rotated, and the vehicle starts the traveling by the rotation of the front wheels 2L and 2R through the reduction gear 4a and the drive shaft 4b.

On the other hand, since the controller 34 for steering receives the power save signal $C_0$ set at 0 from the controller 32 for traveling, the controller 34 calculates the motor drive command value $M_S$ on the basis of the vehicle speed $V_V$ and with reference to the control map of FIG. 4 and updates the obtained value in the command value storing area at the step S4. Next, the routine proceeds to the step S42 wherein the controller 34 decides that the vehicle is not put in the energy save mode. Therefore, the routine proceeds to the step S5 wherein the controller 34 reads the steer angle θ. Following this, the routine proceeds to the step S6 wherein the controller 34 decides that the steer condition flag F is set at 0 since the vehicle is put in the non-steered condition just after the turning on of the electric source switch SW. The routine, therefore, proceeds through the step S10 to the step S41 wherein the motor drive command value $M_S$ is set at 0 and is stored in command value storing area instead of the motor drive command value calculated at the step S4. Then, the routine proceeds to the step S9 through the step S10 wherein the controller outputs the motor drive command value $M_S$ set at 0 to the drive circuit 35 for steering to maintain the stop condition of the electric motor 21 for steering.

When the steering wheel 5 is steered by an angle greater than the set value $θ_S$ from the non-steered condition, the controller 34 decides at the step S6 that the vehicle is put in the steered condition, and therefore the routine proceeds to the step 49 wherein the rotation speed N is compared with the preset speed $N_0$. Since the rotation speed is still smaller than the preset speed $N_0$, the routine proceeds to the step S50 wherein the current limiting signal $C_{IH}$ set at 1 is supplied to the drive circuit 35. Therefore, the drive circuit 35 for steering selects the limited current value $I_H$ which is determined according to the current limiting signal $C_{IH}$ and is smaller than the normal current value $I_N$. Next, the controller 34 sets the steer condition flag F at 1 at the step S7 and resets the time value $T_M$ to 0. Then, the routine proceeds to the step S9 wherein the controller 34 outputs the motor drive current value $M_S$ calculated at the step S4 and stored in the command value storing area to the drive circuit 35 for steering.

Figure 14:
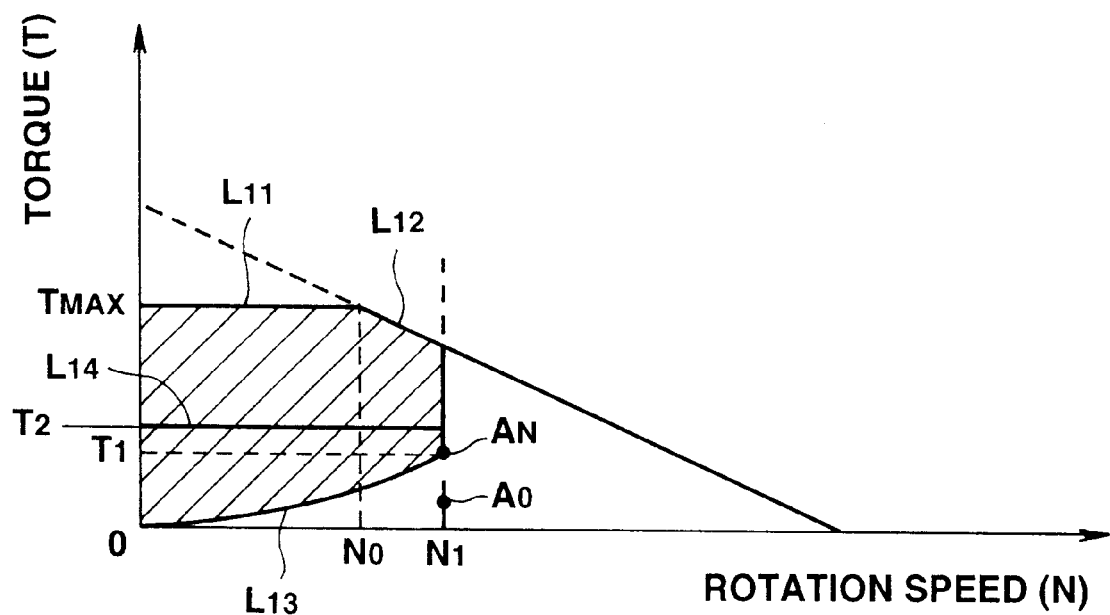
FIG. 14 is a graph which shows the characteristics of an electric motor for steering and a hydraulic pump for steering of the fourth embodiment.

Therefore, the electric motor 21 is started to rotate under the current limited condition, and the rotation speed N thereof is increased along the characteristic line $L_{11}$ keeping the constant torque $T_{MAX}$ as shown in FIG. 14. Then, when the rotation speed N of the electric motor 21 becomes greater than or equal to the preset speed $N_0$, the routine proceeds from the step S49 to the step S51 where the current limiting value $C_{IH}$ is set at 0 so as to supply the normal current value $I_N$ from the drive circuit 35 for steering to the electric motor 21 for steering. Therefore, the torque of the electric motor 21 is decreased along the characteristic line $L_{12}$ in the rated condition, and when the rotation speed N reaches the preset rotation speed $N_1$ by which the necessary flow amount for steering is ensured, the torque of the electric motor 21 is set at a rated point $A_N$ where an output torque $T_1$ necessary for steering is ensured.

Therefore, the input torque characteristic of the hydraulic pump 19 reaches the rated point $A_N$ by the increase of the torque according to the increase of the rotation speed N. In this situation, the acceleration time, which is indicated by the hatching area surrounded by the characteristic lines $L_{11}$, $L_{12}$ and $L_{13}$, is set to ensure the desired steer responsiveness. Consequently, when the controller 32 for traveling executes the normal control mode, the drive circuit 35 for steering outputs the normal drive power having a relatively high current value to the electric motor 21 for steering. Therefore, the electric motor 21 starts to rotate such that the hydraulic pump 19 discharges the working fluid (oil). According to the steered degree of the steering wheel 5 the rotary valve 17 is switched to operate the power cylinder 13 so as to generate the steering assisting force.

When the condition of the steering wheel 5 is returned from the steered condition to the non-steered condition, the electric motor 21 is kept rotating until the timer value $T_M$ becomes greater than or equal to the preset value 5 seconds. When the timer value $T_M$ reaches the preset value 5 seconds, the routine proceeds to the step S41 wherein the controller 34 sets the motor command value $M_S$ at 0 and updates the stored value in the command value storing area by this new value $M_S=0$. Therefore, when the routine proceeds to the step S9, the controller 34 outputs the motor drive command value $M_S$ set at 0 to the drive circuit 35 so as to stop the supply of the electric power to the electric motor 21 for steering to stop the rotation of the electric motor 21.

Thereafter, when at least one of the battery voltage $V_{BD}$ and the charged condition of the battery unit 31 for traveling become smaller than the respective preset values due to the continuation of the long traveling, the controller 32 detects this condition of the battery unit 31 and changes the control mode from the normal control mode to the energy save mode by outputting the energy-save mode signal $C_0$ set at 1 to the controller 34 for steering. Therefore, when the processing of FIG. 12 reaches the step S42, the routine proceeds to the step S43 since the energy save mode signal $C_0$ is set at 0. At the step S43 the controller 34 decides as to whether the steer condition flag F is set at 1 or not. When the steer condition flag F is set at 1, that is, when the electric motor 21 is rotating in the steered condition, the routine proceeds to the step S9 wherein the controller 34 outputs the motor drive command value $M_S$ calculated at the step S4 and stored in the command value storing area to the drive circuit 35 so as to continue the rotation of the electric motor 21 and to prohibit the stop of the electric motor 21 when the controller 32 for traveling is put in the energy save mode.

In case that the controller 32 selects the energy save mode, if the electric motor 21 is stopped and the steer condition flag F is reset at 0, the routine proceeds from the step S43 to the step S44 wherein the steer flag F is set at 1. Following this, the routine proceeds to the step S45 wherein the controller 34 for steering outputs the current limiting command signal $C_{IL}$ set at 1 to the drive circuit 35 so that the drive circuit 35 outputs the limited current value $I_L$ of the necessary minimum to the electric motor 21 for steering. Then, the routine proceeds to the step S46 wherein the controller 34 outputs the motor drive command value $M_S$ calculated at the step S4 and stored in the command value storing area to the drive circuit 35.

Accordingly, the drive circuit 35 supplies the electric power sufficiently limited in current to the electric motor 21 for steering, and the electric motor 21 performs a relatively small torque as compared with that in the normal condition as shown by the characteristic line $L_{14}$ of FIG. 14. Therefore, the load to the auxiliary battery unit 41 becomes small to prevent the load of the battery unit 31 for traveling from radically increasing through the DC/Dc converter 40. This enables the elimination of a disturbance factor to the controller 32 for traveling.

In this situation, since the electric motor 21 is rotated in the current limited condition, the output torque takes a small value when the rotation speed N becomes the necessary rotation speed $N_1$, as shown in FIG. 4. Therefore, the load point $A_0$ in the non-steered condition set in the energy save mode takes a small value as compared with the rated point $A_N$ in the steered condition by the lowered amount of the output torque.

When the electric motor 21 for steering is rotated from the stopped condition without the current limiting in a condition that the controller 32 for traveling is put in the energy save mode, the load at starting may function as disturbance to the battery unit 31 for traveling through the DC/DC converter 40 such that the battery voltage $V_{BD}$ of the battery unit 31 for traveling is lowered to a value smaller than the operable voltage of the controller 32. In this situation, the vehicle is put in the coasting mode to stop the electric motor 3 for traveling and the electric motor 21 for steering.

Then, although the electric motor 21 for steering is started in the current limited condition, the current limiting signal $C_{IL}$ is returned to the logical value 0 after a predetermined time period elapsed so that the drive electric power having the rated current value $I_N$ is outputted from the drive circuit 35 to the electric motor 21 for steering. Therefore, the electric motor 21 increases its torque so that the hydraulic pump 19 performs a torque characteristic of the rated point $A_N$. Thereafter, the steer condition flag F is set at 1, and the routine proceeds, as is similar to that in the steered condition, from the step S43 to the step S9 wherein the controller 34 outputs the motor drive command value $M_S$ calculated at the step S4 to the drive circuit 35 for steering so as to prohibit the stop of the electric motor 21 and to continue the rotation of the electric motor 21.

With this fourth embodiment of the power steering apparatus according to the present invention, in case that the controller 34 controls the electric motor 21 by using the auxiliary battery 41 float-charged by the battery unit 31 for traveling through the DC/DC converter 40, the stop of the rotation of the electric motor 21 is prohibited when the controller 32 for traveling becomes put in the energy save mode, and the electric motor 21 is started to rotate in the current limited condition when the controller 32 for traveling is changed to the energy save mode within a time that the electric motor 21 is stopping. Therefore, it becomes possible to certainly avoid the increase of the load to the battery unit 31 at the starting of the electric motor 21.

Further, since the current limiting operation is executed to the electric motor 21 at the starting in the low speed range even during a normal condition of the battery unit 31, it becomes possible to certainly prevent the generation of rush current which is ten or more times the rated current in a range where the counter electromotive voltage is small.

Figure 15:
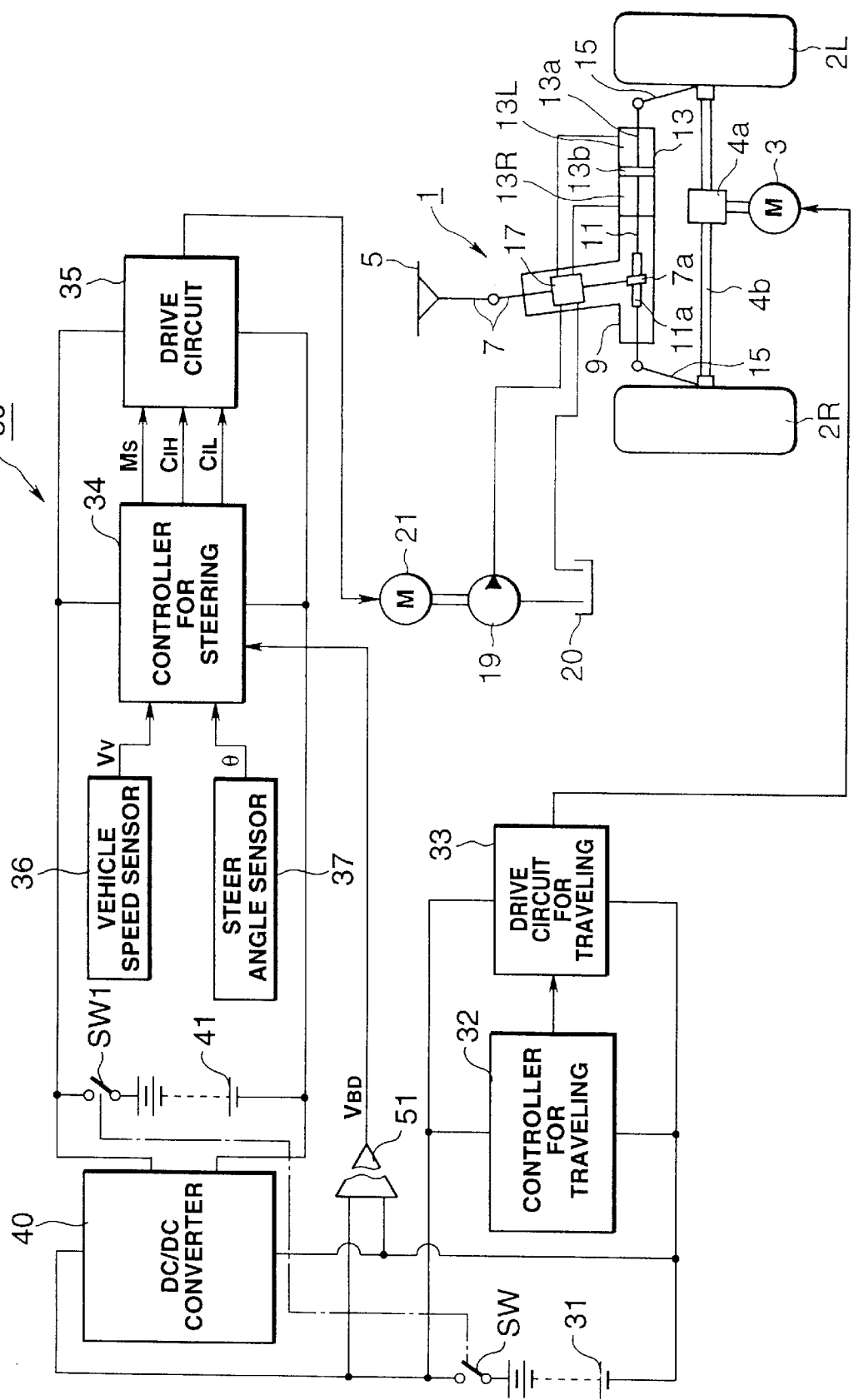
FIG. 15 is a schematic structural view showing a fifth embodiment of the power steering apparatus according to the present invention.
Figure 16:
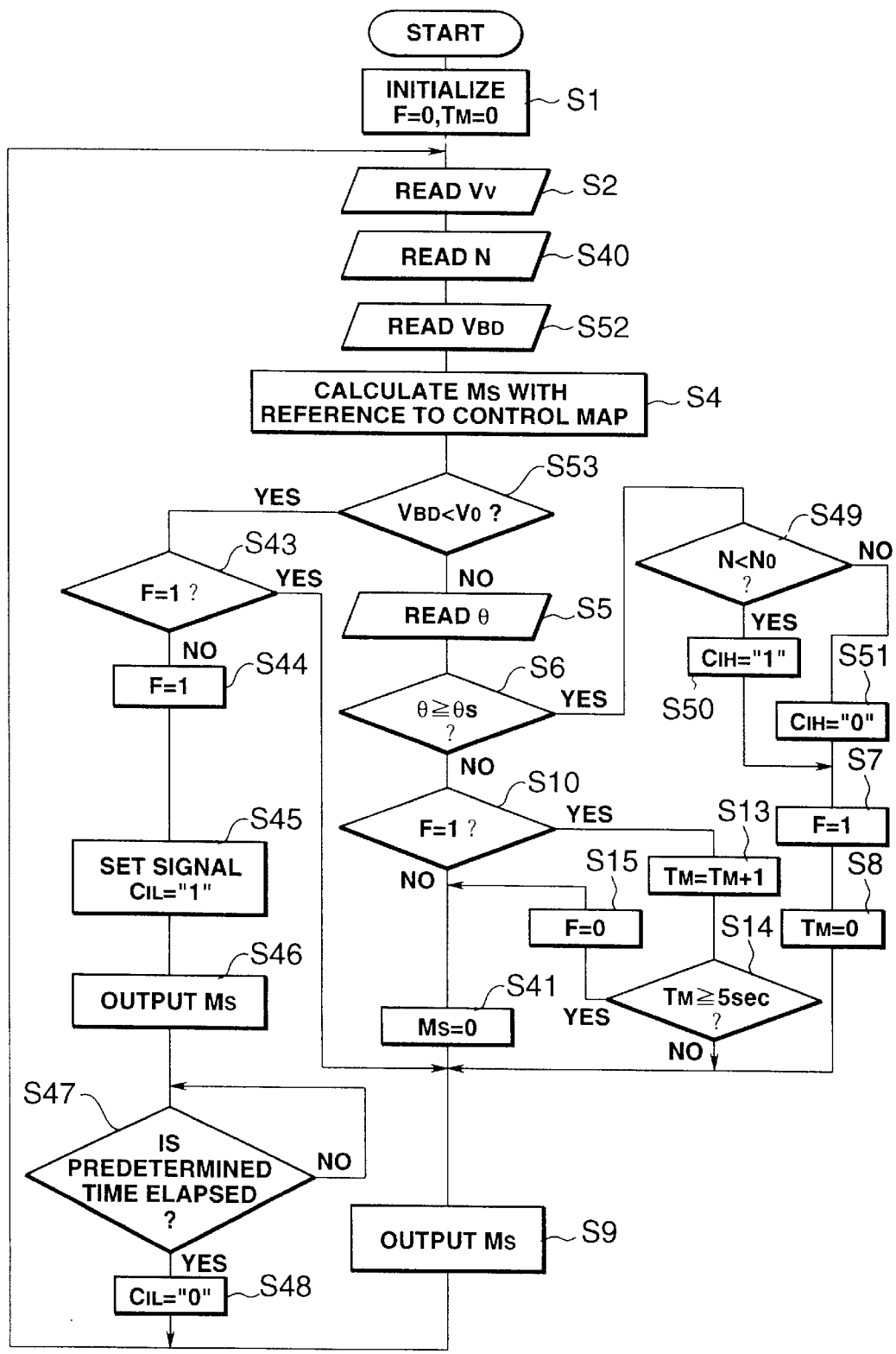
FIG. 16 is a flowchart which shows an electric-motor control procedure of a controller for steering in the fifth embodiment.

Next, referring to FIGS. 15 and 16, there is shown a fifth embodiment of the power steering apparatus according to the present invention. The fifth embodiment is arranged to decide as to whether the controller 32 for traveling is moved to the energy save mode or not by directly detecting the lowering of the battery voltage of the battery unit 31 for traveling.

The fifth embodiment is also arranged to forcibly stop the electric motor 3 for traveling and the electric motor 21 for steering by putting the controller 32 in the coasting mode when the battery voltage $V_{BD}$ of the battery unit 31 for steering becomes smaller than the inoperative voltage of the controller 32. That is, as shown in FIG. 15, an output of the energy save mode signal $C_0$ from the controller 32 is omitted, and an insulation amplifier 51 for detecting the battery voltage $V_{BD}$ of the battery unit 31 for traveling is provided, and the voltage value detected by the insulation amplifier 51 is inputted to the controller 34 for steering. The other construction of the fifth embodiment is the same as that of the fourth embodiment.

The electric motor control processing executed by the controller 34 for steering of the fifth embodiment is shown in FIG. 16. A step S53 for reading the battery voltage $V_{BD}$ detected by the insulation amplifier 51 is inserted between the steps S40 and S4 of the processing in FIG. 13. A step S53 for deciding as to whether the battery voltage $V_{BD}$ is smaller than a preset voltage $V_0$ at which the controller 32 is put in the energy save mode or not is added instead of the step S42. The other steps shown in FIG. 16 are the same as those of FIG. 13 and the explanation thereof is omitted herein.

With the fifth embodiment of the power steering apparatus according to the present invention, since the controller 34 for steering decides as to whether the controller 32 for traveling is put in the energy save mode or not upon directly detecting the battery voltage $V_{BD}$, the routine in the fifth embodiment proceeds from the step S53 to the step S5 to execute the normal control of the electric motor 21 as is similar to the fourth embodiment when the battery voltage $V_{BD}$ is greater than or equal to the preset value $V_0$ (normal mode) and proceeds from the step S53 to the step S43 to execute the prohibiting process of the stop control of the motor 21 and the current limiting process as is similar to the fourth embodiment when the battery voltage $V_{BD}$ is smaller than the preset value $V_0$. Therefore, the fifth embodiment of the power steering apparatus according to the present invention ensures the advantages obtained in the fourth embodiment.

Although the preferred embodiments according to the present invention have been shown and described such that the front wheels 2L and 2R are driven by the electric motor 3 for traveling, it will be understood that the invention may not be limited to this disclosure and may be applied to the vehicles of a rear-wheel drive type or four-wheel drive type.

Further, while the preferred embodiments according to the present invention have been shown and described such that each of the controller 32 for traveling and the controller 34 for steering is provided with a microcomputer, it will-be understood that each controller 32, 34 may be constructed by the combinations of the electronic circuit such as logical circuits and comparing circuits, and that the controllers 32 and 34 may be constituted by one controller.

Additionally, although the preferred embodiments according to the present invention have been shown and described such that a steering assist-power generating mechanism employs the hydraulic oil pressure, it will be understood that the invention is not limited to this and may use a fluid pressure mechanism employing air or water.

What is claimed is:

1. A power steering apparatus comprising:
   a steering mechanism that steers a wheel;
   a steering assist-power generating mechanism that generates and supplies an assist-power to the steering mechanism;
   a fluid pressure pump supplying pressurized fluid for generating assist power to the steering assist-power generating mechanism;

an electric motor driving the fluid pressure pump;

a steer angle detector that detects a steer angle;

an electric-source voltage detector that detects a voltage of an electric source; and an electric motor controller that stops the electric motor when the electric-source voltage is greater than or equal to a voltage set value and the steer angle is smaller than a steer angle set value, and that does not stop the electric motor when the electric-source voltage is smaller than the voltage set value.

2. A power steering apparatus as defined in claim 1, wherein the electric motor controller calculates a correction coefficient which is changed from 0% to 100% according to lowering of the electric source voltage, and calculates a motor drive command value supplied to the electric motor, by multiplying the correction coefficient with a predetermined motor drive command value when the voltage becomes smaller than the voltage set value.

3. A power steering apparatus as defined in claim 1, wherein the electric motor controller calculates the steer angle set value, and the steer angle set value decreases according to lowering of the electric source voltage.

4. A power steering apparatus as defined in claim 1, further comprising a travel controller that controls a motive power of a vehicle and that can enter an energy-save mode, wherein the electric motor controller does not stop the electric motor when an energy-save mode detector detects that the travel controller is in the energy-save mode.

5. A power steering apparatus as defined in claim 1, wherein the electric motor controller continues to rotate the electric motor for a time period just after the steer angle becomes smaller than the steer angle set value.

6. A power steering apparatus as defined in claim 1, further comprising a second electric motor that drives a vehicle and that is powered by the electric source.

7. A power steering apparatus as defined in claim 1, wherein the electric motor controller corrects a motor drive command based on the voltage of the electric source.

8. A power steering apparatus as defined in claim 7, wherein the motor drive command increases as the voltage of the electric source decreases.

9. A power steering apparatus as defined in claim 1, wherein the electric motor controller calculates a correction coefficient based on the voltage of the electric source, and corrects a motor drive command with the correction coefficient.

10. A power steering apparatus as defined in claim 1, wherein the electric motor controller calculates a correction coefficient based on the voltage of the electric source, and a motor drive command is multiplied by the correction coefficient before being supplied to the electric motor.

11. A power steering apparatus as defined in claim 10, wherein the correction coefficient increases as the voltage of the electric source decreases.

12. A power steering apparatus as defined in claim 10, wherein the correction coefficient increases as the voltage of the electric source decreases when the voltage of the electric source is within a predetermined range.

13. A power steering apparatus as defined in claim 12, wherein the correction coefficient is a constant value when the voltage of the electric source is below a predetermined voltage.

14. A power steering apparatus as defined in claim 1, wherein the electric motor controller calculates a motor drive command based on vehicle speed, calculates a correction coefficient based on the voltage of the electric source, and corrects the motor drive command based on the correction coefficient.

15. A power steering apparatus as defined in claim 1, wherein the electric motor controller calculates a motor drive command based on vehicle speed, calculates a correction coefficient based on the voltage of the electric source, and multiplies the motor drive command by the correction coefficient.

16. A power steering apparatus as defined in claim 15, wherein the correction coefficient increases as the voltage of the electric source decreases.

17. A power steering apparatus as defined in claim 15, wherein the correction coefficient increases as the voltage of the electric source decreases when the voltage of the electric source is within a predetermined range.

18. A power steering apparatus as defined in claim 17, wherein the correction coefficient is a constant value when the voltage of the electric source is below a predetermined voltage.

19. A power steering apparatus as defined in claim 1, wherein power supplied to the electric motor is stopped when the voltage of the electric source is below a predetermined voltage.

20. A power steering apparatus as defined in claim 1, wherein the electric motor controller calculates the steer angle set value based on the voltage of the electric source.

21. A power steering apparatus as defined in claim 1, wherein the electric motor controller calculates the steer angle set value so as to decrease in a form of a parabolic curve as the voltage of the electric source decreases when the voltage of the electric source is within a predetermined range.

22. A power steering apparatus as defined in claim 21, wherein the electric motor controller sets the steer angle set value at 0 when the voltage of the electric source is below a predetermined voltage.

23. A power steering apparatus as defined in claim 1, wherein the electric source drives the electric motor that drives the fluid pressure pump, and further comprising:

a second electric motor that drives a vehicle and operates from a second electric source; and a converter connected to the second electric source, wherein the converter supplies converted voltage from the second electric source to the electric source.

24. A power steering apparatus as defined in claim 1, further comprising a travel controller that controls a motive power of a vehicle.

25. A power steering apparatus as defined in claim 24, wherein the electric motor controller does not stop the electric motor when the travel controller is in an energy-save mode.

26. A power steering apparatus as defined in claim 25, wherein the travel controller monitors a voltage of an electric source for driving the vehicle and the travel controller enters the energy-save mode based on the voltage of the electric source for driving the vehicle.

27. A power steering apparatus as defined in claim 26, wherein the travel controller enters the energy-save mode when the voltage of the electric source for driving the vehicle is smaller than a preset value.

28. A power steering apparatus as defined in claim 25, wherein the travel controller monitors a discharge condition of an electric source for driving the vehicle and the travel controller enters the energy-save mode based on the discharge condition.

29. A power steering apparatus as defined in claim 28, wherein the travel controller enters the energy-save mode when the discharge condition is smaller than a preset value.

30. A power steering apparatus as defined in claim 25, wherein the travel controller monitors a voltage and a discharge condition of an electric source for driving the vehicle and the travel controller enters the energy-save mode when either the voltage is smaller than a corresponding preset value or the discharge condition is smaller than a corresponding preset value.

31. A power steering apparatus as defined in claim 30, wherein the travel controller is in the normal control mode when both the voltage and discharge condition of the electric source for driving the vehicle are higher than the corresponding preset values.

32. A power steering apparatus comprising:

a steering mechanism that steers a wheel;

a steering assist-power generating mechanism that generates and supplies an assist-power to the steering mechanism;

a fluid pressure pump supplying pressurized fluid for generating assist power to the steering assist-power generating mechanism;

an electric motor driving the fluid pressure pump;

a steer angle detector that detects a steer angle;

an electric-source voltage detector that detects a voltage of an electric source;

an energy-save mode detector that detects whether a motive power of a vehicle is controlled in an energy-save mode; and an electric motor controller stopping the electric motor when the electric-source voltage is greater than or equal to a voltage set value and the steer angle is smaller than a steer angle set value, the electric motor controller not stopping the electric motor when the energy-save mode is detected.

33. A power steering apparatus as defined in claim 32, wherein the energy-save mode detector includes an electric source voltage detector that detects the voltage of the electric source for traveling.

34. A power steering apparatus as defined in claim 32, wherein the electric motor controller lowers a drive characteristic of the electric motor when the energy-save mode is detected.

35. A power steering apparatus as defined in claim 32, further comprising an auxiliary electric source which is charged by the electric source for traveling and is applied to the electric motor.

36. A power steering apparatus comprising:

a steering mechanism that steers a wheel;

a steering assist-power generating mechanism that generates and supplies an assist-power to the steering mechanism;

a fluid pressure pump supplying pressurized fluid for generating assist power to the steering assist-power generating mechanism;

an electric motor driving the fluid pressure pump;

a steer angle detector that detects a steer angle;

an electric-source voltage detector that detects a voltage of an electric source; and an electric motor controller that stops the electric motor when the steer angle detected by the steer angle detector is smaller than a steer angle set value and that decreases the steer angle set value according to lowering of the electric source voltage.

37. A power steering apparatus comprising:

steering means for steering a wheel;

steering assist-power generating means for generating and supplying an assist-power to the steering means;

supplying means for supplying pressurized fluid for generating assist power to the steering assist-power generating means;

electric driving means for driving the supplying means;

steer angle detecting means for detecting a steer angle;

electric-source voltage detecting means for detecting a voltage of an electric source; and control means for controlling the electric driving means, which stops the electric driving means when the electric-source voltage is greater than or equal to a voltage set value and the steer angle is smaller than a steer angle set value, and that does not stop the electric driving means when the electric-source voltage is smaller than the voltage set value.

* * * * *